US012658042B2

(12) United States Patent
M Iyengar et al.

(10) Patent No.: US 12,658,042 B2
(45) Date of Patent: Jun. 16, 2026

(54) HANDLING EMERGENCY VEHICLE ALERTS IN CELLULAR-VEHICLE-TO-EVERYTHING

(71) Applicant: QUALCOMM Incorporated, San Diego, CA (US)

(72) Inventors: Venkatesha M Iyengar, Bengaluru (IN); Seung Ryul Yang, San Diego, CA (US); Sai Naresh Gajapaka, Hyderabad (IN); Sai Jitendra Varma Gadiraju, Hyderabad (IN); Gopinath S, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 18/629,662

(22) Filed: Apr. 8, 2024

(65) Prior Publication Data

US 2025/0316169 A1 Oct. 9, 2025

(51) Int. Cl.
G08G 1/0967 (2006.01)
B60Q 9/00 (2006.01)

(52) U.S. Cl.
CPC ......... G08G 1/096783 (2013.01); B60Q 9/00 (2013.01)

(58) Field of Classification Search
CPC ...... B06Q 9/00; G08G 1/0965; G08G 1/0967; G08G 1/096758; G08G 1/096783; G08G 1/096791
USPC ......................................... 701/119
See application file for complete search history.

(56) References Cited

U.S. PATENT DOCUMENTS

| | | | | |
|---|---|---|---|---|
| 8,466,805 B2 * | 6/2013 | Waymire | ............ | G08G 1/0965 |
| | | | | 340/902 |
| 10,210,756 B2 * | 2/2019 | Arunachalam | ...... | G08G 1/0965 |
| 10,569,707 B1 * | 2/2020 | Adam | ...................... | B60Q 9/00 |
| 10,685,563 B2 * | 6/2020 | Edwards | ............. | G08G 1/0965 |
| 2012/0313792 A1 | 12/2012 | Behm et al. | | |
| 2015/0116133 A1 * | 4/2015 | Mawbey | ............. | G08G 1/0965 |
| | | | | 340/902 |
| 2015/0254978 A1 * | 9/2015 | Mawbey | ................. | B60Q 1/52 |
| | | | | 340/902 |

(Continued)

FOREIGN PATENT DOCUMENTS

| | | | | | |
|---|---|---|---|---|---|
| CA | 3027645 A1 * | 2/2020 | .......... | G08G 1/0965 |
| CA | 3115924 A1 * | 4/2020 | ........... | H04W 72/56 |

(Continued)

OTHER PUBLICATIONS

Tippannavar, et al., "EVAS—Emergency Vehicle Alert System using LoRa for automobiles," 2023 International Conference on Recent Trends in Electronics and Communication (ICRTEC), Mysore, India, 2023, pp. 1-5, doi: 10.1109/ICRTEC56977.2023.10111859 (https://ieeexplore.ieee.org/document/10111859) (Year: 2023).*

(Continued)

*Primary Examiner* — Atul Trivedi
(74) *Attorney, Agent, or Firm* — Thien T. Nguyen

(57) ABSTRACT

An apparatus comprising: at least one transceiver; at least one memory; and at least one processor, in signal communication with the at least one transceiver, and the at least one memory, the at least one processor configured to: receive an alert signal of an emergency vehicle approaching the vehicle; and produce an alert notification on an infotainment system in response to receiving the alert signal.

30 Claims, 15 Drawing Sheets

(56)            References Cited

U.S. PATENT DOCUMENTS

| | | | |
|---|---|---|---|
| 2016/0253903 A1* | 9/2016 | Wilk | G08G 1/087 |
| | | | 340/902 |
| 2018/0268690 A1 | 9/2018 | Gebers | |
| 2020/0126416 A1 | 4/2020 | Montemurro et al. | |
| 2021/0049909 A1* | 2/2021 | Tucker | B60Q 1/525 |
| 2021/0173408 A1* | 6/2021 | Luo | G10L 25/51 |
| 2021/0209949 A1* | 7/2021 | Hisanaga | G08G 1/16 |
| 2021/0212158 A1* | 7/2021 | Robertson, II | H04W 76/50 |
| 2022/0044562 A1* | 2/2022 | Schaak | H04R 3/00 |
| 2022/0157165 A1* | 5/2022 | Dantrey | G06N 3/045 |
| 2023/0124536 A1* | 4/2023 | Chien | G08G 1/0112 |
| | | | 455/404.2 |
| 2023/0156621 A1* | 5/2023 | Shuman | G08G 1/096758 |
| | | | 455/522 |
| 2023/0354002 A1* | 11/2023 | Shuman | G08G 1/096725 |
| 2023/0408642 A1* | 12/2023 | Monteuuis | G01S 13/931 |
| 2024/0153380 A1* | 5/2024 | Barcia | G08G 1/166 |
| 2025/0316169 A1* | 10/2025 | M Iyengar | G08G 1/096758 |
| 2025/0378749 A1* | 12/2025 | Kaufman | G08B 21/18 |

FOREIGN PATENT DOCUMENTS

| | | | | |
|---|---|---|---|---|
| CN | 108688691 B | * | 1/2021 | B61L 23/22 |
| EP | 4258237 A1 | * | 10/2023 | G08G 1/09623 |

OTHER PUBLICATIONS

International Search Report and Written Opinion—PCT/US2025/016402—ISA/EPO—Jun. 3, 2025.

* cited by examiner

1400

Receiving an alert signal of an emergency vehicle approaching the vehicle          1402

Producing an alert notification on the infotainment system in response to receiving the alert signal          1404

1500

Receiving a safety message from a first vehicle approaching the RSU — 1502

Receiving an alert of an emergency vehicle approaching the RSU — 1504

Transmitting a control message to the first vehicle in response to receiving the alert, wherein the control message causes an infotainment system in the first vehicle to switch to an emergency alert mode — 1506

HANDLING EMERGENCY VEHICLE ALERTS IN CELLULAR-VEHICLE-TO-EVERYTHING

BACKGROUND

At present, there are a large number of emergency vehicles traveling on the roadways every day in most urban areas. These emergency vehicles travel through traffic as quickly as possible to get to their destinations and may include first responder vehicles such as, for example, ambulances, paramedic, police, firefighter vehicles, government vehicles, etc. In order to reduce the arrival time of these emergency vehicles, these emergency vehicles typically attempt to travel at increased speeds but these increased speeds generally increase the likelihood of accident with other vehicles. Unfortunately, there a numerous collisions involving these emergency vehicles and other non-emergency vehicles every year. Many of these collisions are serious and have resulted in fatalities for both the drivers and passengers of both the emergency and non-emergency vehicles. Generally, many of these collisions are the result of impairment and/or distracted driving on the part of the drivers of the non-emergency vehicles.

Today, many drivers of modern vehicles travel the roadways with electronic communication and/or entertainment systems (generally referred to as "infotainment" systems) within their vehicles. Examples of these infotainment systems include mobile smartphones and in-vehicle entertainment systems that allow the driver and/or passengers of the vehicle to text, browse the Internet, make and receive phone calls, listen to music, watch movies/videos, and play video games within the vehicle while traveling along the roadways. Moreover, many of these modern vehicles have been designed to eliminate exterior noise. These factors result in many drivers not being aware of the approach of an emergency vehicle because the traditional lights and sirens of these emergency vehicles may not be effective or audible to many of these drivers.

SUMMARY

Techniques are discussed for a system and method for handling emergency vehicle alerts in a Cellular-Vehicle-to-Everything (C-V2X). These techniques include a method for handling emergency vehicle alerts within a vehicle having an infotainment system, the method comprising: receiving an alert signal of an emergency vehicle approaching the vehicle; and producing an alert notification on the infotainment system in based on the alert signal.

Utilizing these techniques, an apparatus of a vehicle for handling received emergency vehicle alerts, wherein the vehicle is an ego vehicle, the apparatus comprising: at least one transceiver; at least one memory; and at least one processor, in signal communication with the at least one transceiver, and the at least one memory, the at least one processor configured to: receive an alert signal of an emergency vehicle approaching the ego vehicle; and produce an alert notification on an infotainment system based on the alert signal.

These techniques may also include a method for handling emergency vehicle alerts in a roadside unit (RSU), the method comprising: receiving, with at least one transceiver, a safety message from a first vehicle approaching the RSU; receiving, with the at least one transceiver, an alert of an emergency vehicle approaching the RSU; and transmitting a control message to the first vehicle based on the alert, wherein the control message causes an infotainment system in the first vehicle to switch to an emergency alert mode.

Utilizing these techniques, a roadside unit (RSU) comprising: at least one transceiver; at least one memory; and at least one processor, in signal communication with the at least one transceiver, and the at least one memory, the at least one processor configured to: receive, via the at least one transceiver, a safety message from a first vehicle approaching the RSU; receive, via the at least one transceiver, an alert of an emergency vehicle approaching the RSU; and transmit, via the at least one transceiver, a control message to the first vehicle based on the alert, wherein the control message causes an infotainment system in the first vehicle to switch to an emergency alert mode.

Other devices, apparatuses, systems, methods, features, and advantages of the invention will be or will become apparent to one with skill in the art upon examination of the following figures and detailed description. It is intended that all such additional devices, apparatuses, systems, methods, features, and advantages be included within this description, be within the scope of the invention, and be protected by the accompanying claims.

DETAILED DESCRIPTION

Figure 1:
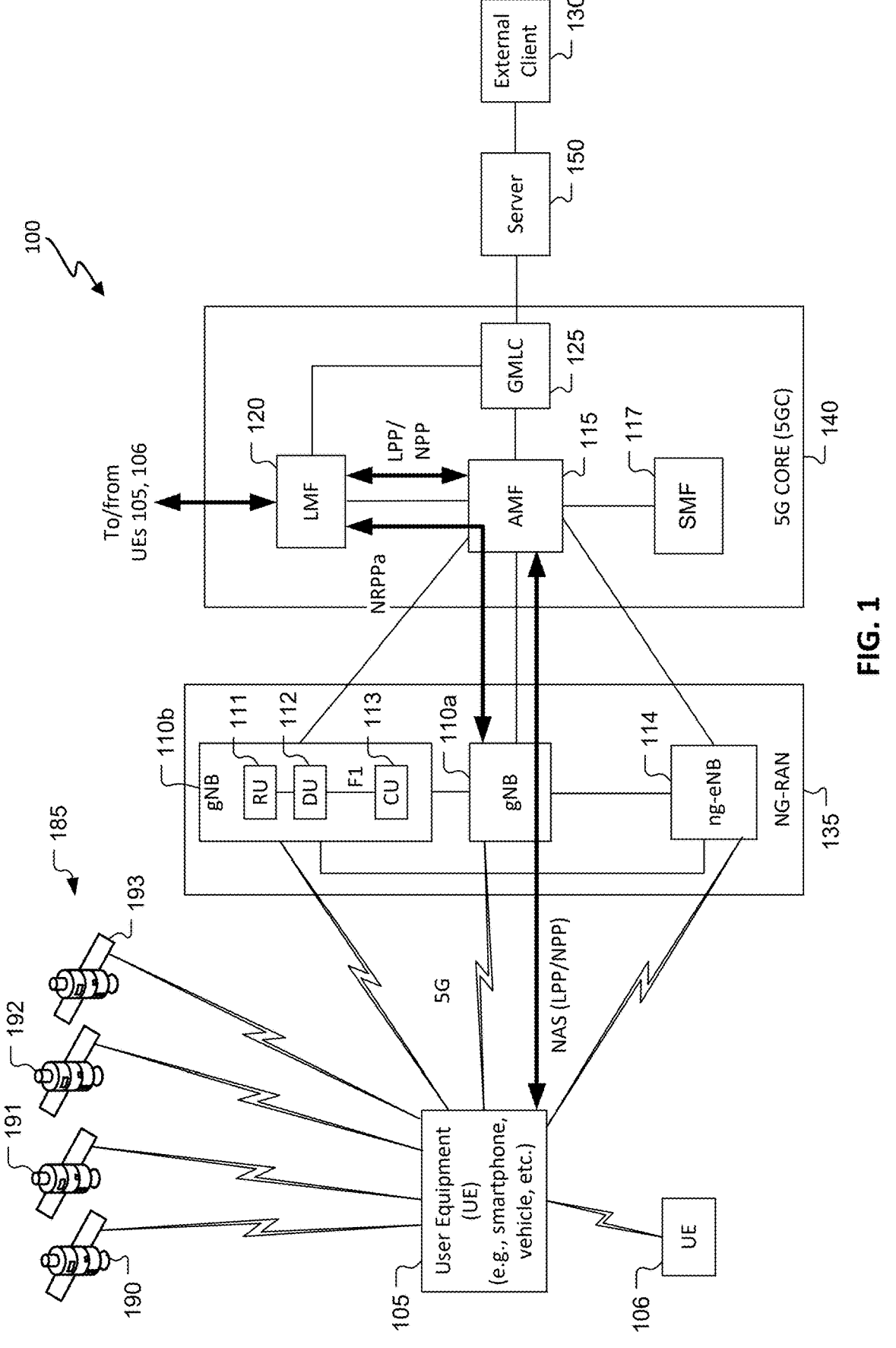
FIG. 1 is a simplified diagram of an example wireless communications system.

Techniques are discussed for a system and method for handling emergency vehicle alerts in cellular-vehicle-to-everything (C-V2X). In general, these techniques are directed to techniques/protocols to control the media playback during emergency vehicle alert using C-V2X. The proposed solution may include adding additional information element (IE) to the Emergency Vehicle Alert (EVA) message and/or the VehicleSafetyExtensions of the Basic Safety Message (BSM). This may include modifying the SAE J2735 standard specification. In some aspects, a roadside unit (RSU) may obtain relevant information regarding various vehicles including the emergency vehicles and communicate (unicast/multicast) with respective vehicles to instruct the respective vehicles to perform one or more operations to control various types of audio/video features within communication and/or entertainment systems within the respective vehicles.

Utilizing these techniques, an apparatus of a vehicle for handling received emergency vehicle alerts is discussed. The apparatus may comprise: at least one transceiver; at least one memory; and at least one processor, in signal communication with the at least one transceiver, and the at least one memory, the at least one processor configured to: receive an alert signal of an emergency vehicle approaching the vehicle; and produce an alert notification on an infotainment system in response to receiving the alert signal.

Also discussed is a roadside unit (RSU) comprising: at least one transceiver; at least one memory; and at least one processor, in signal communication with the at least one transceiver, and the at least one memory, the at least one processor configured to: receive, via the at least one transceiver, a safety message from a first vehicle approaching the RSU; receive, via the at least one transceiver, an alert of an emergency vehicle approaching the RSU; and transmit, via the at least one transceiver, a control message to the first vehicle in response to receiving the alert, wherein the control message causes an infotainment system in the first vehicle to switch to an emergency alert mode.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC).

Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output)

devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beam-forming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such implementations, the 5GC 140 may be configured to control different air interfaces. For example, the 5GC 140 may be connected to a WLAN using a Non-3GPP Inter Working Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some implementations, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other examples, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi® APs, an MME, and an E-SMLC.

As noted, in some examples, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the position of the UE.

Figure 2:
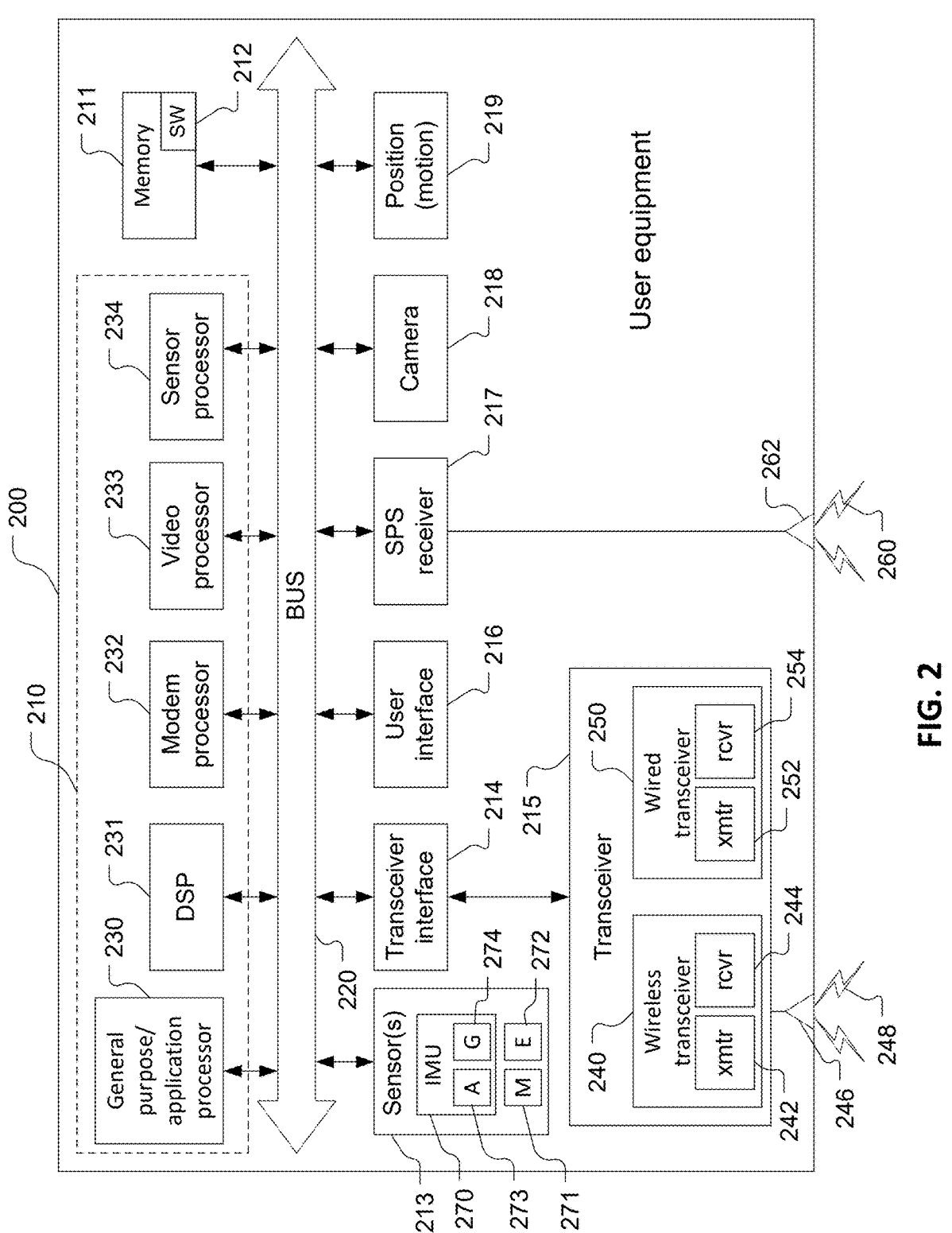
FIG. 2 is a system block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)). The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/ measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs)

such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a GPS receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion.

Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
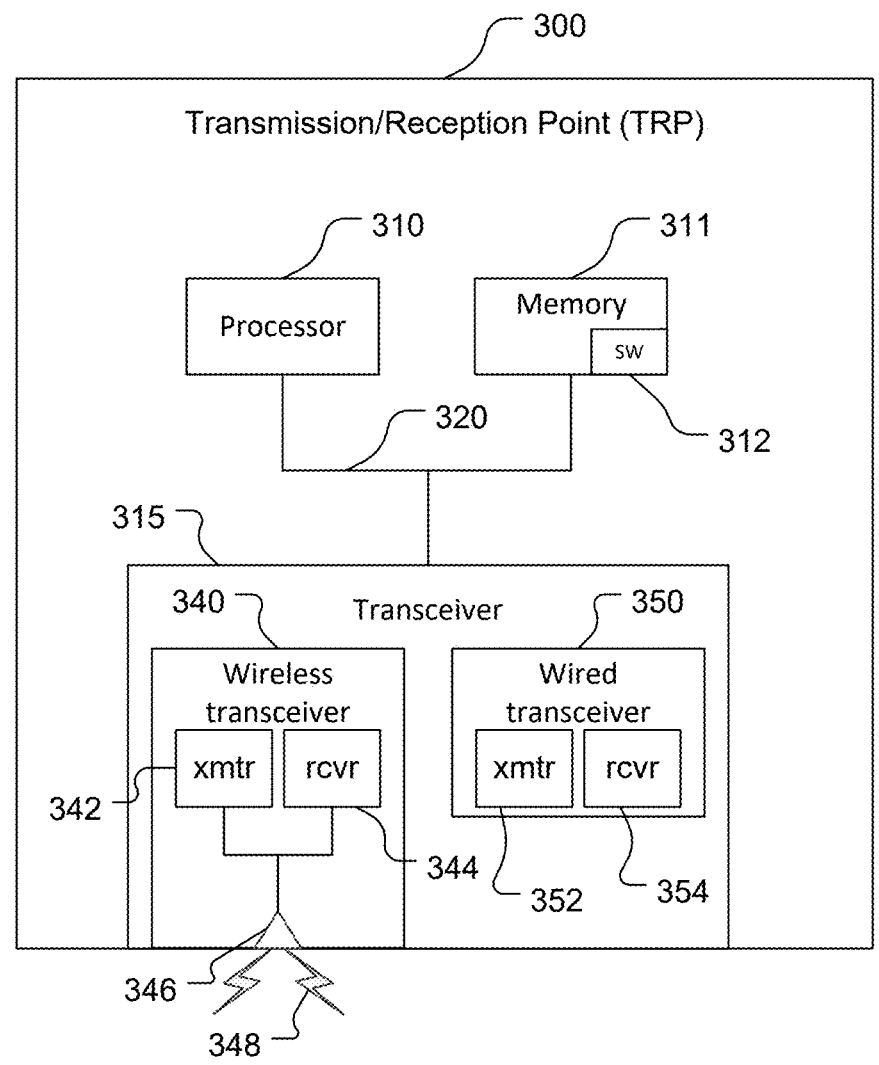
FIG. 3 is a system block diagram of components of an example transmission/reception point shown in FIG. 1.

Referring also to FIG. 3, an example of a TRP 300 of the gNBs 110a, 110b and/or the ng-eNB 114 may comprise a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
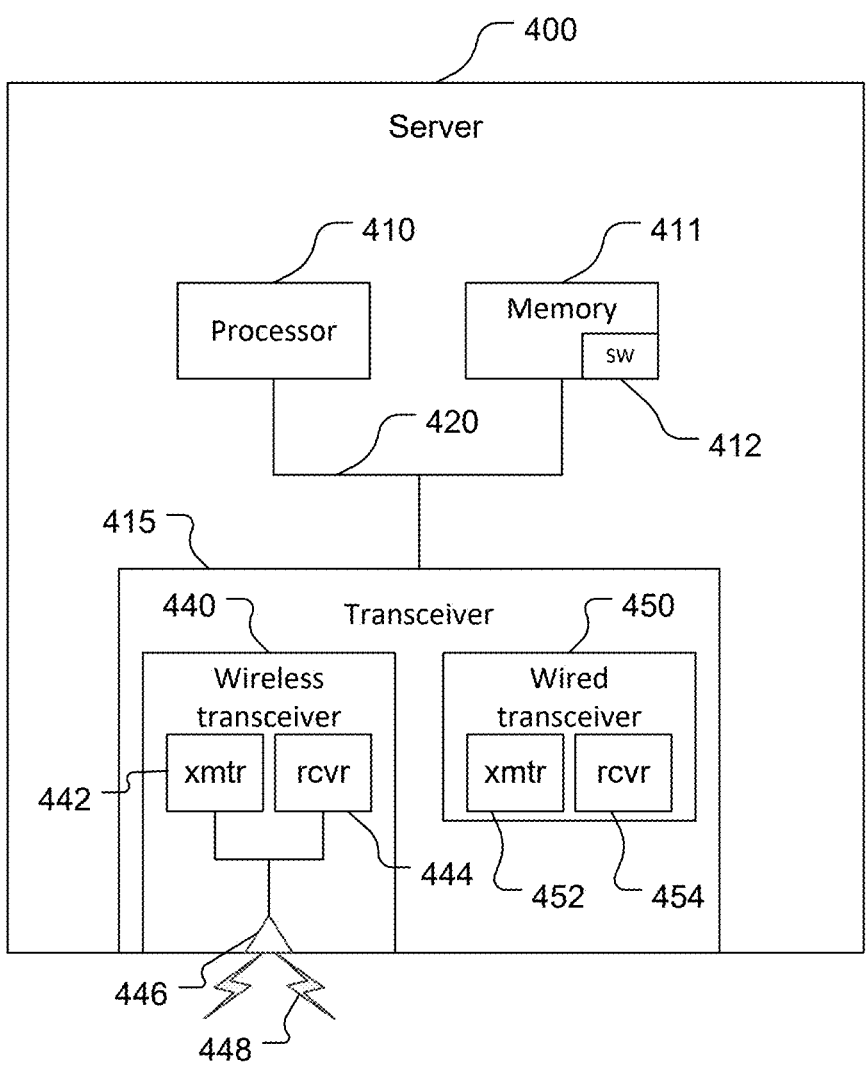
FIG. 4 is a system block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{(Rx \to Tx)}$ (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference $T_{(Tx \to Rx)}$ between the transmission time of the RTT measurement signal from the base station and the ToA of the RTT response at the base station to the UE-reported time difference $T_{(Rx \to Tx)}$, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
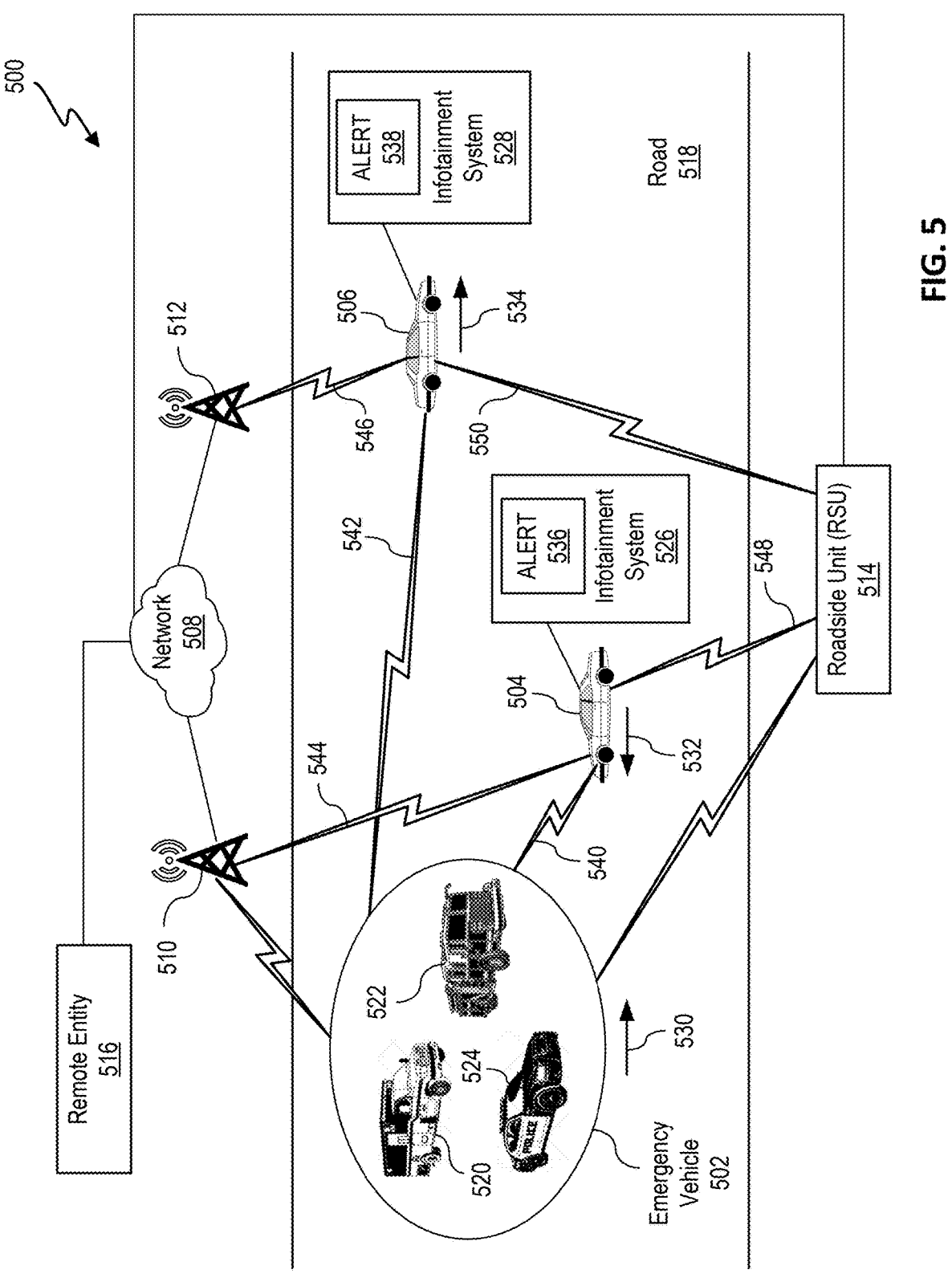
FIG. 5 is a functional system block diagram of an example of an implementation of a system for handling emergency vehicle alerts utilizing C-V2X techniques.

FIG. 5 is a functional system block diagram of an example of an implementation of a system 500 for handling emergency vehicle 502 alerts utilizing C-V2X techniques. The system 500 may optionally include the emergency vehicle 502, a first vehicle 504, a second vehicle 506, a network 508, a first base station 510, a second base station 512, a roadside unit (RSU) 514, and a remote entity 516. In this example, the emergency vehicle 502, first vehicle 504, and second vehicle 506 are shown traveling along varying paths along a road 518. The emergency vehicle 502 may be, for example, an ambulance 520, firetruck 522, or a police vehicle 524. Other examples of the emergency vehicle 502 may optionally include paramedical vehicles, government vehicles, or other first responder vehicles. In this example, the first vehicle 504 and second vehicle 506 are shown to have a first infotainment system 526 and a second infotainment system 528, respectively. The first infotainment system 526 and a second infotainment system 528 may each be a system of components that offer a range of comfort and safety functions that may include a radio, a multimedia system, a navigation system, and a communication system with connectivity functions (e.g., a cellular communication device). In general, an infotainment system may be in signal communication with one or more electronic control units (ECUs) within a vehicle. As an example, an infotainment system may include a touchscreen and/or display that is mounted in (or on) the dashboard in the approximate middle of the vehicle. An ECU is generally a device within the vehicle that controls one or several electrical systems in that vehicle and tells electrical systems within the vehicle what to do and how to operate. Generally, at the ECU has a core that is a processor/microcontroller that is controlled by embedded software.

In this example, the emergency vehicle 502, first vehicle 504, and second vehicle 506 are shown traveling along an emergency vehicle path 530, a first vehicle path 532, and a second vehicle path 534, respectively, where the emergency vehicle 502 and the first vehicle 504 are approaching each other along the road 518 in approximately opposite directions and the emergency vehicle 502 is approaching the second vehicle 506 from behind along the road 518. The RSU 514 is shown as a device located along the side of the road 518 that may be in signal communication with the network 508 either wirelessly or via a wired connection. The network 508 may be a telecommunication network such as, for example, a cellular network, the Internet, and/or other type of communication network. The network 508 may be in signal communication with the remote entity 516 and one or more cellular base stations (i.e., first base station 510 and second base station 512).

In this example, the RSU 514 may be a wireless communication device located on the side of the road 518 that is configured to provide connectivity and information to the passing vehicles (e.g., emergency vehicle 502, first vehicle 504, and/or second vehicle 506) along the road 518. The RSU 514 may include one or more sensors that include, for example, a camera, an acoustic sensor, or other types of sensors. The RSU 514 may transmit a plurality of signals related to, for example, the acquired sensor data of the environment surrounding the road 518 that includes the emergency vehicle 502, first vehicle 504, second vehicle 506, safety warnings, traffic information, etc.

The base stations 510 and 512 may each be a base station of a wireless communication network (i.e., network 508) having the remote entity 516 (also interchangeably referred to as a remote server and/or a network entity). The wireless base stations 510 and 512 may be in signal communication with the emergency vehicle 502, first vehicle 504, and second vehicle 506 providing both communications and positional assistance data. In this example, each of the wireless base stations 510 and 512 may be the NG-RAN 135, gNB 110a, and/or TRP 300 and the remote server may be the server 400 described previously.

The circuits, components, modules, and/or devices of, or associated with the system 500 and other devices are described as being in signal communication, communicatively coupled, and/or electrically coupled (or simply "coupled") with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information may be passed from one circuit, component, module, and/or device to another in varying digital formats without passing through a direct electromagnetic connection.

In this example, the emergency vehicle 502, first vehicle 504, and second vehicle 506 may communicate with each other utilizing V2X transmissions for sidelink (SL) positioning utilizing vehicle-to-everything (V2X) signaling and protocols through UE-to-UE SL communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as SL communications without limiting the communications to a particular protocol. Alternatively, the emergency vehicle 502, first vehicle 504, and second vehicle 506 may communicate with each other utilizing C-V2X transmissions over the network 508 of the wireless base stations 510 and 512 and the remote entity 516, or a combination of the wireless base stations 510 and 512 and the RSU 514. In this example, the first vehicle 504 and/or second vehicle 506 may be designated as a "ego"

vehicle, where an ego vehicle is a vehicle that contains sensors that generally perceive the environment around the corresponding vehicle.

The system 500 may utilize C-V2X technology to allow the emergency vehicle 502, first vehicle 504, and second vehicle 506 to communicate directly or indirectly with each other. C-V2X technology includes V2X communications or direct access technology (known as DSRC (Dedicated Short-Range Communication)). In general, V2X technology involves high-bandwidth and low-latency communications that utilize sensors, cameras, and wireless connectivity, and allow vehicles to share real-time information with their drivers, other vehicles, pedestrians and roadway infrastructure like traffic lights. It is often desirable to be able to determine the location of one or more target vehicles relative to a source vehicle. In general, a source vehicle is configured to determine the location of the target vehicles by transmitting and receiving periodic messages to the target vehicles. As an example, currently V2X systems periodically broadcast Basic Safety Messages (BSM) or Cooperative Awareness Messages (CAM) at a sufficient high rate to have a sufficiently high probability of "on time" reception by the neighboring target vehicles.

V2X technology also incorporates more specific type of communications such as vehicle-to-vehicle (V2V), vehicle-to-infrastructure (V2I), vehicle-to-network (V2N), vehicle-to-pedestrian (V2P), and vehicle-to-device (V2D) communications. In general, V2X communication describes communication between a vehicle and any entity that may affect, or may be affected by, the vehicle; and may utilize common communication technologies like BLUETOOTH®, mobile networks, and/or dedicated special communication technologies. C-V2X adds the ability to also communicate with wireless cellular communication networks and devices such that vehicles are able to communicate directly with other vehicles, infrastructure, and vulnerable road users with low-latency messages to drive applications that can have an immediate safety benefit. When complemented with cellular network connectivity, the data exchanged among vehicles and road infrastructure can help make entire transportation systems more efficient and personal travel more convenient.

In addition to BSM and CAM messages, the emergency vehicle 502 may also utilize an Emergency Vehicle Alert (EVA) that transmits an EVA alert signal to other vehicles (e.g., the first vehicle 504 and second vehicle 506) that alerts these vehicles about the location of and the movement of the emergency vehicle 502 responding to an incident so that drivers of the other vehicles do not interfere with emergency response of the emergency vehicle 502 along the road 518.

In this disclosure, techniques are discussed for a system 500 and method for handling emergency vehicle 502 alerts utilizing these C-V2X techniques. In general, these techniques are directed to techniques/protocols to control the media playback of first infotainment system 526 and second infotainment system 528 of the first vehicle 504 and second vehicle 506, respectively, during emergency vehicle alert using C-V2X. These techniques may include adding additional information element (IE) to the Emergency Vehicle Alert (EVA) message and/or the VehicleSafetyExtensions of the BSM. This may include modifying the SAE J2735 standard specification of the SAE international for Dedicatee Short Range Communications (DSRC) Message Set Dictionary. These techniques may include utilizing the RSU 514 to obtain relevant information regarding various vehicles (i.e., first vehicle 504 and second vehicle 506) including the emergency vehicle 502 and communicate (via unicast and/or multicast) with the respective vehicles (i.e., first vehicle 504 and second vehicle 506) to instruct the vehicles to perform one or more operations to control various types of audio/video features within the infotainment systems (i.e., the first infotainment system 526 and second infotainment system 528) within the respective vehicles.

As an example of potentially modifying the SAE J2735 standard, the standard may include adding an additional IE to either the EVA message and/or the VehicleSafetyExtensions of the BSM. For example, modifying the existing SAE J2735 standard to handle cases of emergency vehicles (i.e., emergency vehicle 502) may include adding an additional IE in the EVA message may include, for example, the following:

```
Emergency VehicleAlert::=SEQUENCE {
    timestamp MinuteOfTheYear OPTIONAL,
    id TemporaryID OPTIONAL,
    rsaMsg RoadSideAlert,
        --the DSRCmsgID inside this
        --data frame is set as per the
        --RoadSideAlert.
    responseType Response Type OPTIONAL,
    details EmergencyDetails OPTIONAL,
        --Combines these 3 items:
        --SirenInUse,
        --LightbarInUse,
        --MultiVehicleReponse,
    notify alertNotifyOtherVehicles OPTIONAL, --Added
        for Emergency Vehicles
    mass VehicleMass OPTIONAL,
    basicType VehicleType OPTIONAL,
        --gross size and axle cnt
    --type of vehicle and agency when known
    vehicleType VehicleGroupAffected OPTIONAL,
    responseEquip          IncidentResponseEquipment
        OPTIONAL,
    responderType ResponderGroupAffected OPTIONAL,
    regional SEQUENCE (SIZE (1 . . . 4)) OF
        RegionalExtension    {{Reg-Emergency    Vehicl-
            eAlert}}
    OPTIONAL,
    . . .
    }
```

Additionally, as another example, the existing SAE J2735 standard may be modified to handle cases of emergency vehicles (i.e., emergency vehicle 502) by adding an additional IE in the VehicleSafetyExtensions of the BSM, for example, as follows:

```
VehicleSafetyExtensions::=SEQUENCE {
    events VehicleEventFlags OPTIONAL,
    pathHistory PathHistory OPTIONAL,
    pathPrediction PathPrediction OPTIONAL,
    lights ExteriorLights OPTIONAL,
    notify    AlertNotifyOther    Vehicles    OPTIONAL,
        --Added for Emergency Vehicles
    . . . ,
    timestamp DDateTime OPTIONAL, --Added for secu-
        rity
    height VehicleHeight OPTIONAL --Added for truck
        height
    }
Data Frame: DF_AlertNotifyOtherVehicles
Use: The DF_AlertNotifyOtherVehicles data frame pro-
    vides alert notifications to other vehicles to control their
    media playback to avoid distraction for any incoming
    emergency vehicle in the same path.
```

ASN.1 Representation:
AlertNotifyOther Vehicles::=SEQUENCE {
   mediaControl MediaControlDetails OPTIONAL,
   targetDisplay TargetDisplay OPTIONAL,
   . . .
}
Data Element: DE_MediaControlDetails
Use: The DE_MediaControlDetails data element is used
   to inform the other vehicles to adjust the media controls
   in the vehicle automatically to alert the driver about an
   incoming emergency vehicle in the path.
ASN.1 Representation:
MediaControlDetails::=BIT STRING {
   VideoPlaybackPause (0),
   AudioPlaybackMinimize Volume (1),
   VehicleAssistantPrompt (2),
   ConsoleGraphicDisplay (3),
} (SIZE (4, . . . ))
Data Element: DE_TargetDisplay
Use: The DE_TargetDisplay data element is used to
   specify the other vehicles display in which the alert
   should be notified.
ASN.1 Representation:
TargetDisplay::=BIT STRING {
   ConfiguredDisplaysOnly (0),
   AllPossibleDisplays (1),
} (SIZE (2, . . . ))
In this example, each vehicle (i.e., first vehicle 504 or second vehicle 506) may comprise at least one transceiver; at least one memory; and at least one processor, in signal communication with the at least one transceiver, and the at least one memory, the at least one processor configured to perform a plurality of operations. The at least one transceiver, at least one memory, and at least one processor may be part of the infotainment system, a UE, the ECU, or other system within the vehicle. In the case of a UE, the UE may be in signal communication with or part of the infotainment system.

In this example, the at least one processor may be configured to perform the plurality of operations that include receive an alert signal of an emergency vehicle 502 approaching the vehicle (i.e., the first vehicle 504 and/or the second vehicle 506), and produce an alert notification (i.e., a first alert notification 536 and/or a second alert notification 538) on an infotainment system (i.e., the first infotainment system 526 and/or the second infotainment system 528) in response to receiving the alert signal.

The at least one processor may be configured to receive the alert signal by further being configured to receive a control message and produce the alert notification by further being configured to set the infotainment system to an emergency alert mode in response to the control message. In this example, the emergency vehicle 502 may transmit the alert signal via a first signal path 540 between the emergency vehicle 502 and the first vehicle 504 and a second signal path 542 between the emergency vehicle 502 and the second vehicle 506, where the alert signal may be transmitted via a broadcast, multi-cast, or unicast transmission. The at least one processor may be further configured to determine an intersection of a first path of the emergency vehicle (i.e., the emergency vehicle path 530) and a second path (i.e., either the first vehicle path 532 or the second vehicle path 534) of the vehicle (i.e., either the first vehicle 504 or the second vehicle 506) based on the alert signal that includes the control message. In this example, the control message may include a location, speed, and heading for the emergency vehicle 502 and the infotainment system (i.e., the first infotainment system 526 and/or second infotainment system 528) may include, or be in signal communication with, a positional determination device that is configured to determine the position, speed, and heading of the vehicle (i.e., either the first vehicle 504 or the second vehicle 506). The positional determination device may include, for example, the SPS receiver 217, at least one sensor 213, and position device 219 described previously in relation to FIG. 2. As such, the at least one processor may be configured to determine the intersection of the first path of the emergency vehicle and a second path of the vehicle based on the alert signal/control message and position, speed, and heading of the vehicle.

As another example, the at least one processor may be configured to determine the intersection by being configured to receive, via the at least one transceiver, the intersection from a remote entity that may be either the remote entity 516, RSU 514, or both. As an example, the at least one processor may be configured to determine a vehicle location of the vehicle (i.e., either the first vehicle 504 or the second vehicle 506) by further being configured to transmit, via the at least one transceiver (e.g., along a third signal path 544 to the first base station 510 for the first vehicle 504 and along a fourth signal path 546 to the second base station 512 for the second vehicle 506), positional information of the vehicle to the remote entity 516, receive positional assistance data from the remote entity 516 (via the third signal path 544 for the first vehicle 504 and the fourth signal path 546 for the second vehicle 506), and determine the vehicle location of the vehicle utilizing the positional assistance data from the remote entity 516. Alternatively, the at least one processor may be further configured to transmit a safety message and the alert signal to the remote entity 516, where the safety message includes the BSM that includes a vehicle speed, a vehicle heading of the vehicle, and a location of the vehicle.

In this example, the intersection is defined to include an area where the two paths (i.e., the emergency vehicle path 530 and either the first vehicle path 532 or the second vehicle path 534) along a route and/or road (e.g., the road 518) approximately intersect, meet, or overlap.

In these examples, the emergency alert mode may be configured to cause the at least one processor to perform operations on the infotainment system that includes pausing any media playback on the infotainment system, reducing the audio volume, displaying a location of the emergency vehicle 502, announce with a voice assistant the approach of the emergency vehicle 502, or any combination of these operations. In this example, the at least one processor may be configured to display the location of the emergency vehicle 502 by further being configured to display the location of the emergency vehicle 502 on a main display of the infotainment system (i.e., the first infotainment system 526 and/or second infotainment system 528).

In these examples, the at least one processor may be further configured to determine a threshold for setting the infotainment system to the emergency alert mode, and produce the alert notification on the infotainment system in response to the control message triggering the threshold. As an example, the control message may trigger the threshold based on the position, direction, and speed of the emergency vehicle 502 when compared to the vehicle position, vehicle speed, and vehicle direction. The threshold may be utilized to prevent a potential collision between the emergency vehicle 502 and the vehicle at an intersection of the emergency vehicle path 530 and vehicle path (i.e., first vehicle path 532 and/or second vehicle path 534). As an example, the threshold may include a timer value, a first location value for the location of the vehicle, a second location value for the location of the emergency vehicle, a distance value between the first location value and second location value, or any combination of these values. In this example, the threshold may be updated based on changing conditions, and the conditions may include traffic conditions, a first speed of the vehicle, and/or a second speed of the second vehicle.

As another example, the at least one processor (of either the first vehicle 504 or the second vehicle 506) may be further configured to transmit the safety message to the RSU 514 (via a fifth signal path 548 for the first vehicle 504 or a sixth signal path 550 for the second vehicle 506). In this example, the at least one processor is configured to receive the alert signal by further being configured to receive the alert signal from the RSU 514 (via the fifth signal path 548 for the first vehicle 504 or the sixth signal path 550 for the second vehicle 506), where the alert signal includes a control message, and to produce the alert notification by further being configured to set the infotainment system to the emergency alert mode in response to the control message. The safety message may include a first BSM and the at least one processor may be configured to receive the alert signal by further being configured to receive the control message. The alert signal may include the control message and the EVA, a second BSM, or both; and the first BSM may include a vehicle speed, a vehicle heading of the vehicle, and a location of the vehicle, and the second BSM may include a speed of the emergency vehicle, a heading of the emergency vehicle, and a location of the emergency vehicle.

In this example, the least one processor is further configured to either determine a threshold (as described previously) or receive the threshold, from the RSU 514, for setting the infotainment system (i.e., the first infotainment system 526 or second infotainment system 528) to the emergency alert mode, and produce the alert notification on the infotainment system in response to the control message triggering the threshold. As described previously, the control message may trigger the threshold based on the position, direction, and speed of the emergency vehicle 502 when compared to the vehicle position, vehicle speed, and vehicle direction. The threshold may be utilized to prevent a potential collision between the emergency vehicle 502 and the vehicle at an intersection of the emergency vehicle path 530 and vehicle path (i.e., first vehicle path 532 and/or second vehicle path 534). Again, the threshold may include a timer value, a first location value for the location of the vehicle, a second location value for the location of the emergency vehicle, a distance value between the first location value and second location value, or any combination of these values. Moreover, the threshold may be updated based on changing conditions, and the conditions may include traffic conditions, a first speed of the vehicle, and/or a second speed of the second vehicle.

In this example, the alert signal may include sensing information of the emergency vehicle 502 produced by at least one sensor of the RSU 514. The at least one sensor may produce the sensing information based on one or more images of the emergency vehicle, a size of the emergency vehicle, a speed of the emergency vehicle, a heading of the emergency vehicle, a location of the emergency vehicle, and/or detected siren sound of the emergency vehicle. Alternatively, the alert signal may include sensing information of the emergency vehicle 502 produced by at least one sensor of a second RSU and then transmitted to the RSU that is then transmitted to the vehicle.

As described previously, the at least one processor of each corresponding vehicle may be further configured to determine the intersection of a first path of the emergency vehicle (i.e., the emergency vehicle path 530) and a second path (i.e., either the first vehicle path 532 or the second vehicle path 534) of the vehicle (i.e., either the first vehicle 504 or the second vehicle 506) based on the alert signal that includes the control message. As another example, the at least one processor may be configured to determine the intersection by being configured to receive, via the at least one transceiver, the intersection from the remote entity that may be either the remote entity 516, RSU 514, or both.

Figure 6:
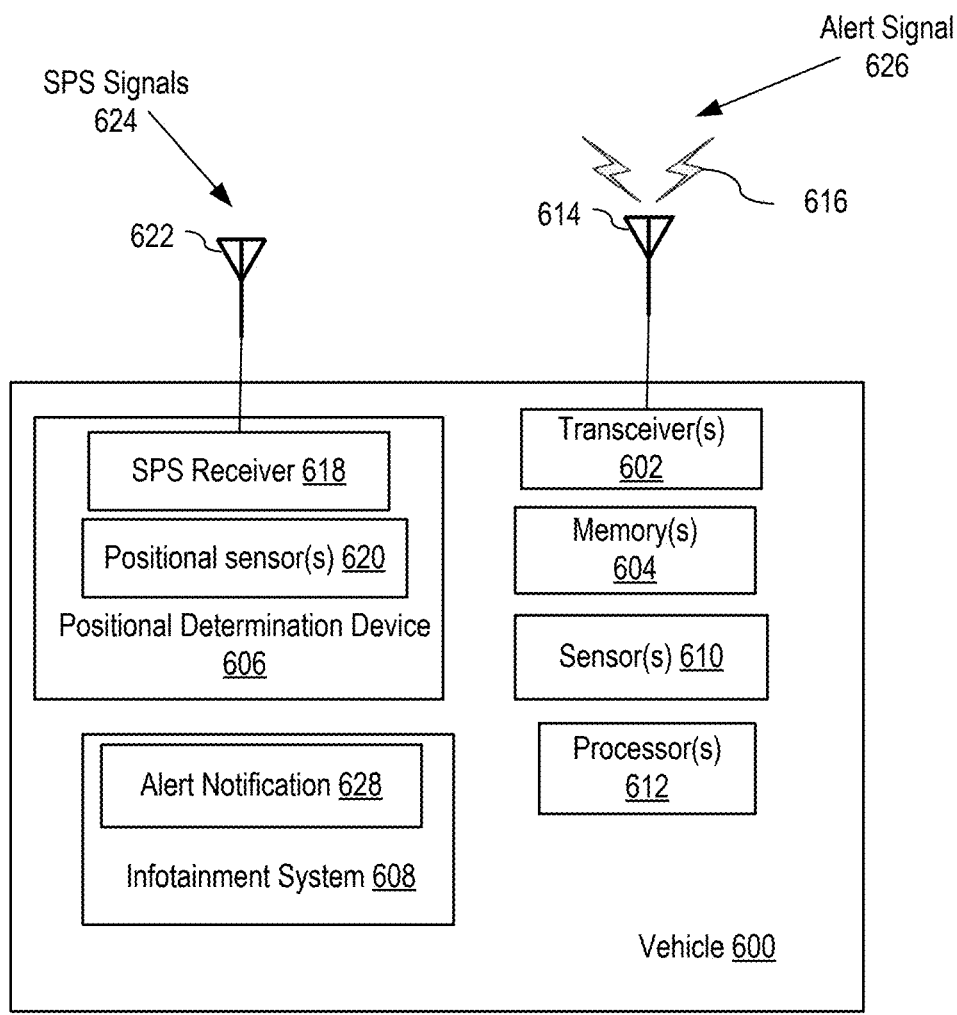
FIG. 6 is a system block diagram of an example of an implementation of a vehicle shown in FIG. 5.

In FIG. 6, a system block diagram of an example of an implementation of a vehicle 600 is shown in accordance with the present disclosure. In this example, the vehicle 600 may include at least one transceiver 602, at least one memory 604, a positional determination device 606, an infotainment system 608, at least one sensor 610, and at least one processor 612, in signal communication with the at least one transceiver 602, the at least one memory 604, the positional determination device 606, the infotainment system 608, and the at least one sensor 610. The vehicle 600 may also include at least one antenna 614 in signal communication with the at least one transceiver 602 that is configured to transmit and receiver wireless signals 616. The positional determination device 606 may include an SPS receiver 618 and one or more positional sensors 620. The SPS receiver 618 may include at least one antenna 622 that is configured to receive SPS signals 624. The at least one sensor 610 may include, for example, a camera for capturing one or more images of the emergency vehicle 502, and an acoustic sensor for detected siren sound of the emergency vehicle 502. As described earlier, the at least one processor 612 is configured to receive an alert signal 626 of an emergency vehicle 502 approaching the vehicle 600 and produce an alert notification 628 on the infotainment system 608 in response to receiving the alert signal 626. In this example, both the first vehicle 504 and second vehicle 506 may be generally described as vehicle 600 and both the first infotainment system 526 and the second infotainment system 528 may be generally described as the infotainment system 608.

The at least one processor 612 may be configured to receive the alert signal 626 by further being configured to receive a control message and produce the alert notification by further being configured to set the infotainment system 608 to an emergency alert mode in response to the control message. The at least one processor 612 may be configured to receive the control message by further being configured to receive, via the at least one transceiver 602, the control message via a broadcast, multi-cast, or unicast transmission of the alert signal. In this example, the emergency alert mode may be configured to cause the at least one processor 612 pause any media playback on the infotainment system 608, reduce audio volume of the infotainment system 608, produce an alert message on a display of the infotainment system 608, display a location of the emergency vehicle 502 on the display of the infotainment system 608, announce with a voice assistant the approach of the emergency vehicle 502, or any combination thereof. Furthermore, the at least one processor 612 may be configured to display the location of the emergency vehicle 502 by further being configured to display the location of the emergency vehicle 502 on a main display of the infotainment system 608.

In this example, it is appreciated that infotainment system 608 is an electronic communication and/or entertainment system within the vehicle 600 that may include a mobile smartphone and/or an in-vehicle entertainment system that allows the driver and/or passengers of the vehicle 600 to text, browse the Internet, make and receive phone calls, listen to music, watch movies/videos, and play video games within the vehicle while traveling along the roadways. Moreover, it is also appreciated that many of these modern vehicles (i.e., vehicle 600) have been designed to eliminate exterior noise within the vehicle 600. These factors may result in the driver of vehicle 600 not being aware of the approach of the emergency vehicle 502 because the traditional lights and sirens of the emergency vehicle 502 may not be effective or audible to driver. As such, for safety reasons, the techniques described herein reduce and potentially remove the distracts to the driver caused by the infotainment system 608 and allow the driver of the vehicle 600 to be audibly and/or graphically notified of the existence and approach of the emergency vehicle 502 to the vehicle 600.

The at least one processor 612 may be further configured to determine a threshold for setting the infotainment system 608 to the emergency alert mode, and produce the alert notification 628 on the infotainment system 608 in response to the control message triggering the threshold. The threshold may be selected from a timer value, a first location value for the location of the vehicle 600, a second location value for the location of the emergency vehicle 502, a distance value between the first location value and second location value, or combination thereof. The threshold may be updated based on changing conditions, and the conditions may be selected from the traffic conditions, a first speed of the vehicle, a second speed of the second vehicle, or a combination thereof.

The at least one processor 612 may be further configured to transmit a safety message to the RSU 514. In this example, the at least one processor 612 may be configured to receive the alert signal 626 by being configured to receive the alert signal 626 from the RSU 514. Further, the safety message may include a first BSM, the alert signal 626 may include the control message and an EVA, a second BSM, or both, the first BSM may include a vehicle speed, a vehicle heading of the vehicle, and a location of the vehicle 600, and the second BSM may include a speed of the emergency vehicle, a heading of the emergency vehicle, and a location of the emergency vehicle 502.

In this example, the alert signal may include sensing information of the emergency vehicle 502 produced by at least one sensor the RSU 514, where the sensing information may include one or more images of the emergency vehicle 502, a size of the emergency vehicle 502, a speed of the emergency vehicle 502, a heading of the emergency vehicle 502, a location of the emergency vehicle 502, a detected siren sound of the emergency vehicle 502, or combination thereof. Moreover, the alert signal 626 may include sensing information of the emergency vehicle 502 produced by at least one sensor of a second RSU and transmitted to the RSU 514.

The at least one processor 612 may also be configured to determine an intersection of a first path of the emergency vehicle 502 and a second path of the vehicle 600 based on the alert signal 626, where the at least one processor 612 may determine the intersection by transmitting the safety message and the alert signal 626 to a remote entity 516, and receiving the intersection from the remote entity 516.

Figure 7:
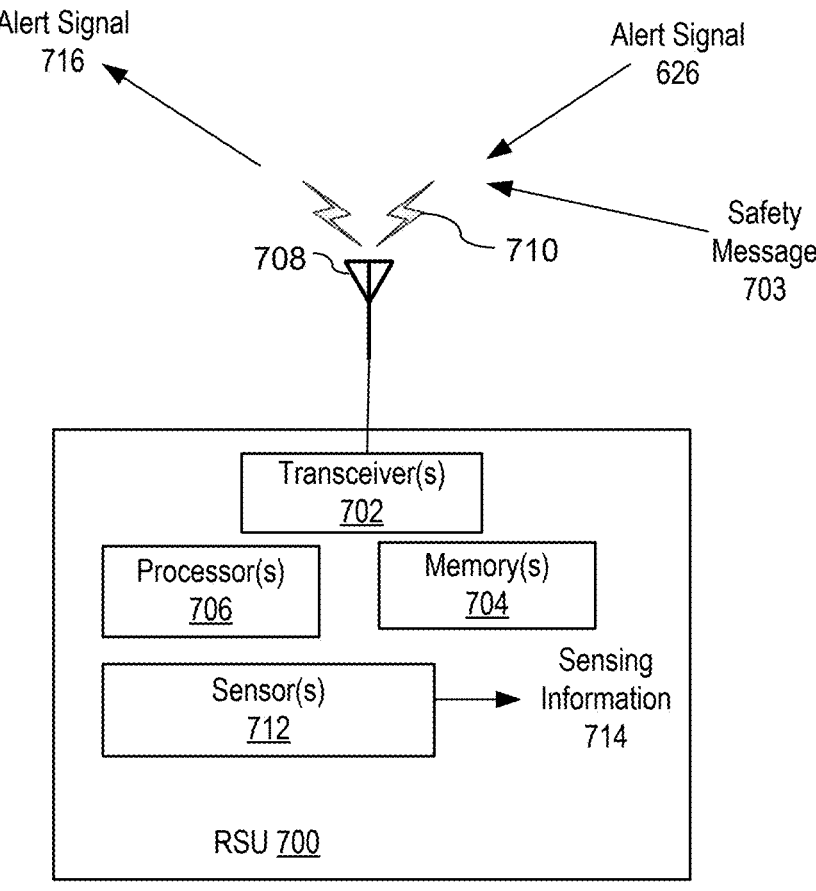
FIG. 7 is a system block diagram of an example of an implementation of a Roadside Unit (RSU) shown in FIG. 5.

In FIG. 7, a system block diagram of an example of an implementation of a RSU 700 is shown in accordance with the present disclosure. The RSU 700 may be the RSU 514 described previously in relation to FIG. 5. In this example, the RSU 700 may include at least one transceiver 702, at least one memory 704, and at least one processor 706, in signal communication with the at least one transceiver 702, and the at least one memory 704. The RSU 700 may also include at least one antenna 708 in signal communication with the at least one transceiver 702 that is configured to transmit and receive wireless signals 710.

The at least one processor 706 may be configured to: receive, via the at least one transceiver 702, a safety message 703 from a first vehicle (i.e., vehicle 600, first vehicle 504, or second vehicle 506) approaching the RSU 700; receive, via the at least one transceiver 702, an alert of an emergency vehicle (i.e., emergency vehicle 502) approaching the RSU 700; and transmit, via the at least one transceiver 702, a control message (as part of a retransmitted alert signal 716) to the first vehicle in response to receiving the alert, where the control message causes an infotainment system (i.e., infotainment system 608, infotainment system 526, or infotainment system 528) in the first vehicle to switch to an emergency alert mode. In this example, the safety message 703 may be a BSM message from the first vehicle.

The control message may cause the infotainment system in the first vehicle to switch to the emergency alert mode by causing the infotainment system to pause any media playback, reduce audio volume, graphically display a location of the emergency vehicle 502, use a voice assistant to announce an approach of the emergency vehicle 502, or any combination thereof. Moreover, the control message may cause the infotainment system in the first vehicle to switch to the emergency alert mode by further causing the infotainment system to graphically display the location of the emergency vehicle 502 on a main display of the infotainment system.

The RSU 700 may also include at least one sensor 712 and receiving the alert may include receiving the alert signal 626 and/or receiving sensing information 714 of the emergency vehicle 502 via the at least one sensor 712. In this example, the safety message may include a first BSM that includes a speed of the first vehicle, heading of the first vehicle, and a location of the first vehicle.

The at least one processor 706 may be configured to receive the alert of the emergency vehicle 502 approaching the RSU 700 by further being configured to sense the emergency vehicle 502 with the at least one sensor 712 to produce the sensing information 714. In this example, the sensing information 714 may include one or more images of the emergency vehicle 502, a size of the emergency vehicle 502, a speed of the emergency vehicle 502, a heading of the emergency vehicle 502, a location of the emergency vehicle 502, and detected siren sound of the emergency vehicle 502. In this example, the at least one sensor 712 may include a camera, acoustic sensor, etc.

In this example, the RSU 700 may receive the alert signal 626 from the emergency vehicle 502 and transmit it to the first vehicle as the retransmitted alert signal 716. In addition, the RSU 700 may also transmit the retransmitted alert signal 716 to one or more other vehicles and RSUs. In this example, the at least one processor 706 may be configured to transmit the control message to the first vehicle by further being configured to transmit the control message to the first vehicle via a second RSU, where the RSU 700 receives the alert signal 626 and retransmits it as retransmitted alert signal 716 to one or more RSUs of which one of these RSUs receives the retransmitted alert signal 716 and retransmits it to the first vehicle.

The at least one processor 706 may be further configured to receive a second safety message from a second vehicle approaching the RSU 700, and transmit a second control message to the second vehicle in response to receiving the alert, where the second control message may cause a second infotainment system in the second vehicle to enter/switch into the emergency alert mode.

Furthermore, the at least one processor 706 may be further configured to determine an intersection of a first path of the emergency vehicle 502 and a second path of the first vehicle based on the safety message and alert. In this example, the safety message includes the BSM, the alert includes the alert signal 626 including an EVA, a second BSM, or both. As described previously, the first BSM includes a speed of the first vehicle, heading of the first vehicle, and a location of the first vehicle, and the second BSM includes a speed of the emergency vehicle 502, a heading of the emergency vehicle 502, and a location of the emergency vehicle 502. Moreover, the at least one processor 706 may be further configured to determine a threshold value for causing the infotainment system in the first vehicle to switch to the emergency alert mode, and transmit the threshold value as part of the control message. The threshold value may be a timer value, a first location value for the location of the first vehicle, a second location value for the location of the emergency vehicle 502, a distance value between the first location value and second location value, or combination thereof. In this example, the threshold value may be updated based on changing conditions, and the conditions may include traffic conditions, a first speed of the first vehicle, a second speed of the second vehicle, etc. If the remote entity 516 is available, the at least one processor 706 may be configured to determine the intersection by further being configured to transmit the safety message and alert to a remote entity 516, and receive the intersection from the remote entity 516.

Figure 8A:
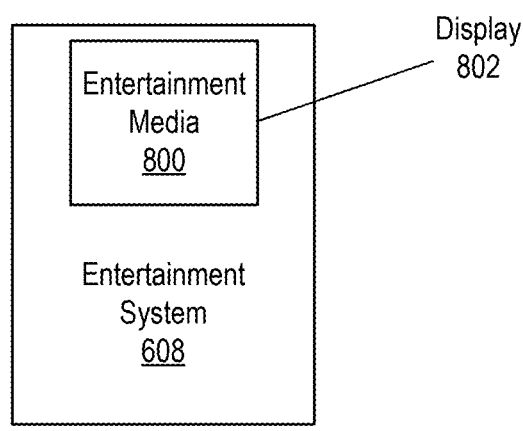
FIG. 8A is a functional block diagram of an example of an implementation of an infotainment system shown in FIG. 5.
Figure 8B:
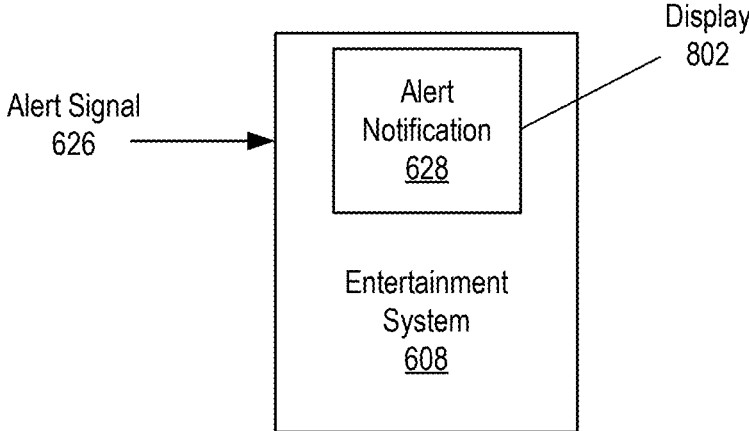
FIG. 8B is a functional block diagram of an example of an implementation of an infotainment system shown in FIGS. 5 and 8A illustrating an alert notification on the infotainment system.

Turning to FIGS. 8A and 8B, functional block diagrams of the infotainment system 608 are shown. Prior to receiving an alert signal 626, the infotainment system 608 is shown displaying entertainment media 800 but once the alert signal is receive, the infotainment system 608 enters/switches into the emergency alert mode. Once in the emergency alert mode, the infotainment system 608 stops, pauses, and/or reduces the audio volume of the entertainment media 800 and optionally displays the alert notification 628 on the display 802 of the infotainment system 608.

Figures 9A, 9B, 9C:
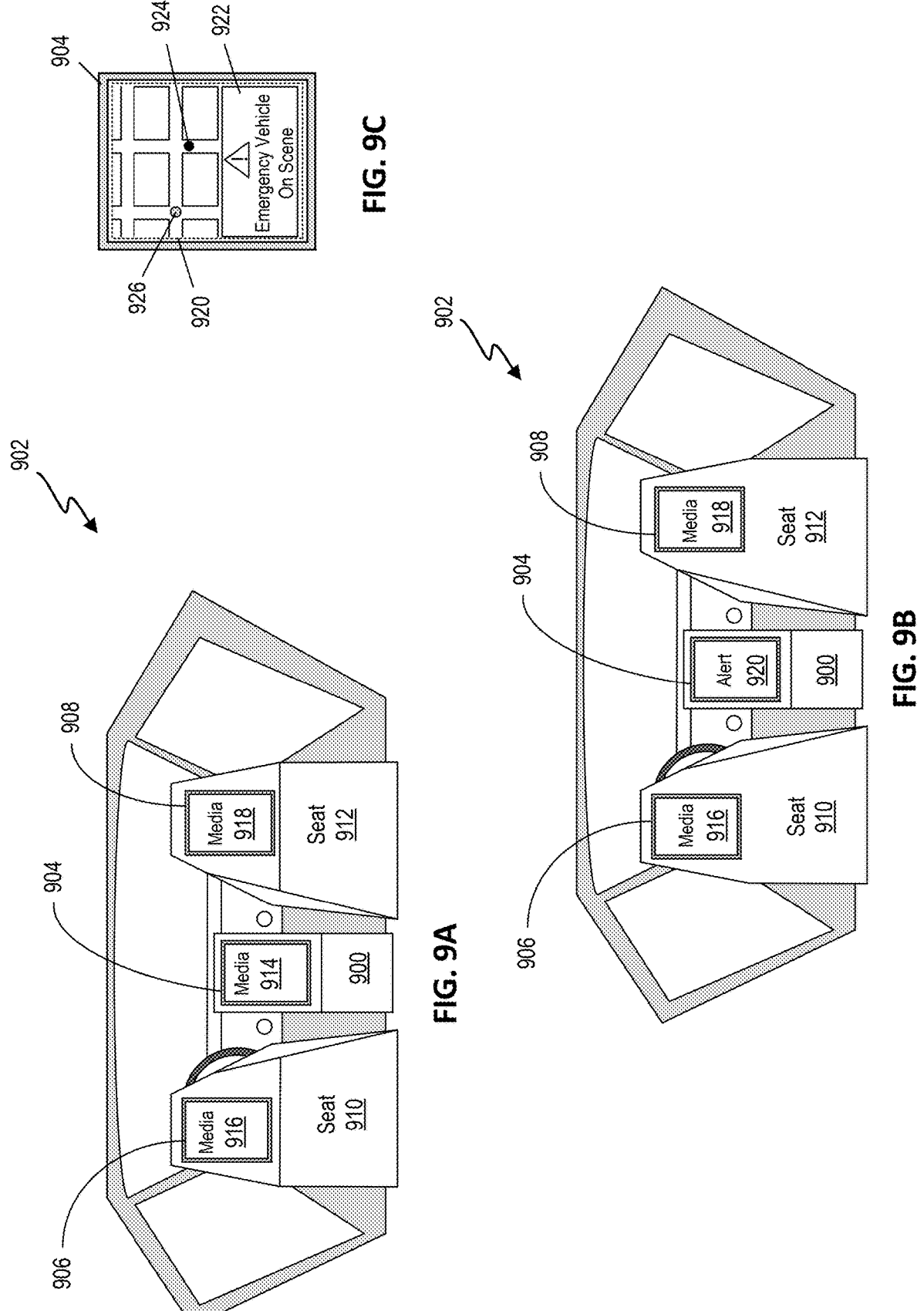
FIG. 9A is a functional block diagram of an example of the implementation of the infotainment system shown in FIGS. 5 and 8A within a vehicle.
FIG. 9B is a functional block diagram of an example of the implementation of the infotainment system shown in FIGS. 5 and 8A within a vehicle illustrating an alert notification on the infotainment system.
FIG. 9C is a functional block diagram of an example of an implementation of an alert notification shown in FIGS. 9A and 9B.

In FIGS. 9A and 9B, a block diagram of an example of the implementation of the infotainment system 900 is shown within a vehicle 902 that may be vehicle 600. In this example, the infotainment system 900 is shown having a main display 904 at the front of the vehicle 902 and two rear displays 906 and 908 on the back of two rear seats 910 and 912, respectively. In this example, the infotainment system 900 may be configured initially to display media 914, 916, and 918 on the main display 904 and the back of the two rear seats 910 and 912, respectively. Once an emergency condition occurs, the vehicle 600 receives the the alert signal 626 (as previously discussed) and one of the displays will show the alert notification 628 from FIG. 6. In general, the main display 904 will, in response, produce the alert notification 920 on the main display 904 so that the driver is aware of the approach of the emergency vehicle 502, while also reducing the volume of any sounds produced by the infotainment system 900 within the vehicle 902. Optionally, the infotainment system 900 may also show the alert notification on the displays 906 and 908 . . . . FIG. 9C illustrates the alert notification 920 that may optionally include an alert section 922 on the display 904 and a map display showing the position 924 of the vehicle 902 and position 926 of the emergency vehicle 502.

Figure 10:
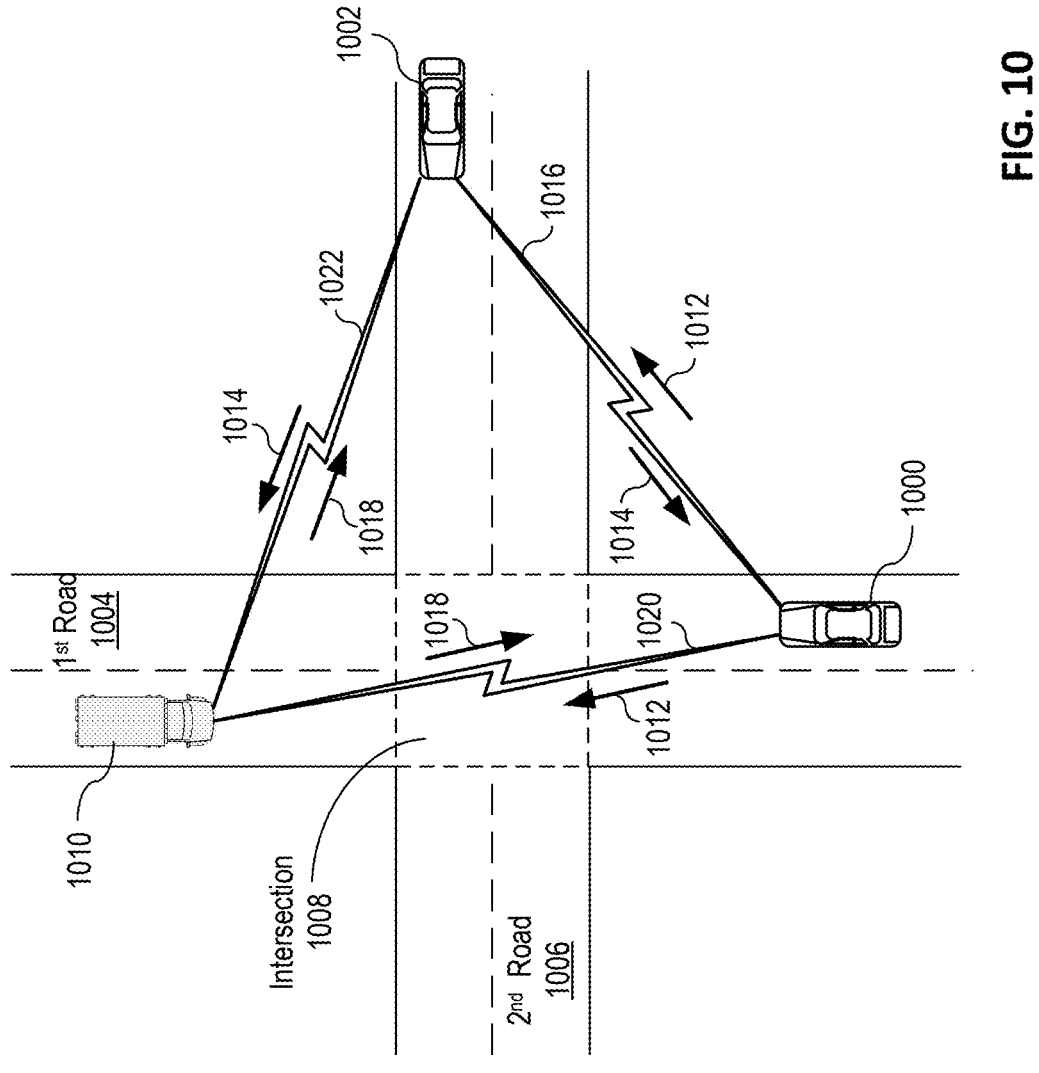
FIG. 10 is a functional block diagram an example of an implementation of the system for handling emergency vehicle alerts utilizing C-V2X techniques, shown in FIG. 5, for two roads having an intersection.

Turning to FIGS. 10-13, different examples of operation are shown for the system 500 for handling emergency vehicle 502 alerts utilizing C-V2X techniques. In FIG. 10, two vehicles (i.e., first vehicle 1000 and second vehicle 1002) are shown traveling along two roads (i.e., first road 1004 and second road 1006) towards an intersection 1008. Also shown is an emergency vehicle 1010 traveling along the first road 1004 towards the intersection 1008 in a direction opposite the direction of the first vehicle 1000. The second vehicle 1002 is also shown traveling towards the intersection 1008 along the second road 1006. In this example, it is assumed that all the vehicles are V2X enabled and have Car Multimedia Controllers (ECUs) on the vehicles and that all of the vehicles are in signal communication utilizing BSM and/or EVA message broadcasts. As such, the first vehicle 1000 and second vehicle 1002 transmit and receive BSM message transmissions 1012 and 1014 via signal path 1016. Under non-emergency conditions, the emergency vehicle 1010 may also transmit and receive BSM message transmissions 1018, 1012, and 1014, via signal paths 1020 and 1022, with the first vehicle 1000 and second vehicle 1002. In this example, the BSM message transmission 1012, 1014, and 1018 are assumed to be broadcast transmission but it is appreciated that the BSM message transmissions may instead be multi-cast or unicast to each vehicle. In an emergency condition, the emergency vehicle 1010 may instead of, or in addition to, transmit an EVA message transmission, along signal paths 1020 and 1022, to the first vehicle 1000 and second vehicle 1002.

In this example, when a host vehicle (either the first vehicle 1000 or the second vehicle 1002) receives the EVA/BSM messages with the control message from the emergency vehicle 1010 indicating that the emergency vehicle 1010 is approaching from the opposite direction, the same direction at a greater speed than the host vehicle, or from another road that will intersect in front of the host vehicle, the host vehicle will perform the following operations: the infotainment system in the host vehicle will pause and media playback such as, for example, video content or a game; the infotainment system will reduce the audio volume of any media playing on the infotainment system; use a display of the infotainment system to graphically display the location of the emergency vehicle 1010, use the host vehicle's voice assistant to announce the approach of the emergency vehicle 1010, or any combination of thereof. In this example, the control message may include commands that specify which display, or displays, in the vehicle are utilized for the alert notification. Once the emergency vehicle 1010 passes the host vehicle, the infotainment than switches/resumes the media playback as usual.

Figure 11:
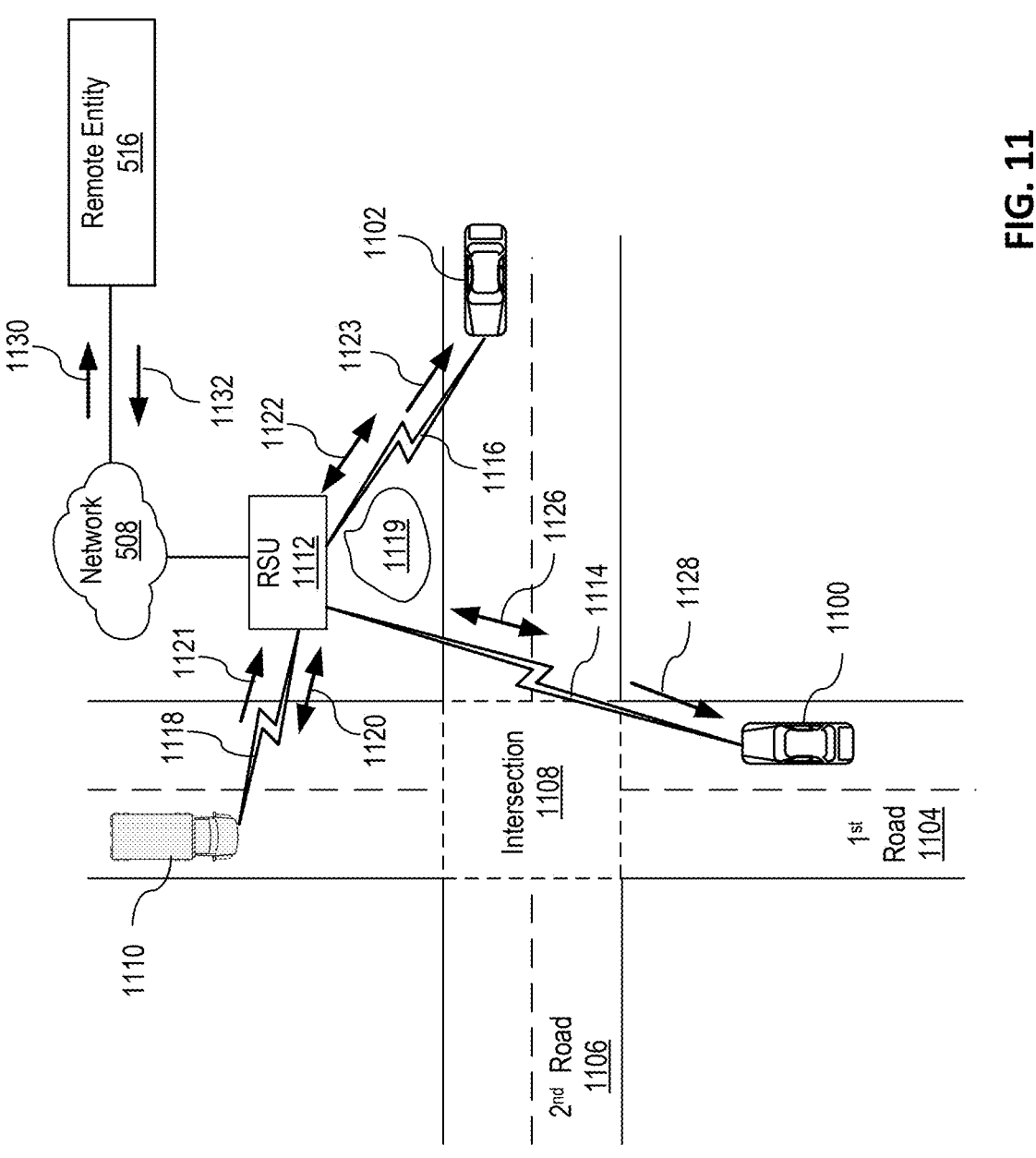
FIG. 11 is a functional block diagram an example of an implementation of the system for handling emergency vehicle alerts utilizing C-V2X techniques, shown in FIG. 5, for two roads having an intersection and a RSU as shown in FIG. 7.

In FIG. 11, two vehicles (i.e., first vehicle 1100 and second vehicle 1102) are shown traveling along two roads (i.e., first road 1104 and second road 1106) towards an intersection 1108. Similar to the example described in relation to FIG. 10, also shown is an emergency vehicle 1110 traveling along the first road 1104 towards the intersection 1108 in a direction opposite the direction of the first vehicle 1100. The second vehicle 1102 is also shown traveling towards the intersection 1108 along the second road 1106.

An RSU 1112 is shown located on the side of the first road 1104 close to the intersection 1108. In this example, the RSU 1112 has line-of-sight with the first vehicle 1100, second vehicle 1102, and emergency vehicle 1110 and it is assumed that all the vehicles are V2X enabled and are in signal communication with the RSU 1112 utilizing BSM and/or EVA message broadcasts along signal paths 1114, 1116, and 1118, respectively.

In this example, while the RSU 1112 has line-of-sight to all of the vehicles but the individual vehicles may not have line-of-sight to each other. For example, the first vehicle 1100 is shown as having line-of-sight with the emergency vehicle 1110 but the second vehicle 1102 does not because they may be an object 1119 blocking the line-of-sight between the emergency vehicle 1110 and second vehicle 1102. The RSU 1112 may be utilized to assist the communication of an alert signal between the emergency vehicle 1110 and the second vehicle 1102 as an intermediate communication device. Therefore, the RSU 1112 may receive the BSM message signal 1120 and an EVA message 1121 from the emergency vehicle 1110 and the BSM message signal 1122 from the second vehicle 1102. In this example, the BSM message signals 1120 and 1122 are shown as two-way communication signals because the BSM messages may be transmitted (e.g., broadcast) from the emergency vehicle 1110 to the RSU 1112 and the RSU 1112 may receive the BSM message from the emergency vehicle 1110 and, in response, transmit back BSM messages to the emergency vehicle 1110. If an emergency condition occurs and the emergency vehicle 1110 transmits the EVA message 1121 instead of, or in combination with the BSM message signal 1120, the EVA message 1121 may be shown as a one-way signal transmission signal because it is transmitting the emergency information to the RSU 1112 that may be different than the BSM message signal 1120.

If the EVA message 1121 includes the control message, then the RSU 1112 can compute and determine that the emergency vehicle 1110 and second vehicle 1102 are going to have paths that intersect at approximately the intersection 1108 based on the speed, heading, and location information of the emergency vehicle 1110 and second vehicle 1102 received from the EVA message 1121 and BSM message signal 1122. In response, the RSU 1112 may broadcast, multicast, or unicast the control message 1123 to the second vehicle 1102 to request/command that second vehicle 1102 to perform the following operations: the infotainment system in the second vehicle 1102 will pause and media playback such as, for example, video content or a game; the infotainment system will reduce the audio volume of any media playing on the infotainment system; use a display of the infotainment system to graphically display the location of the emergency vehicle 1010, use the voice assistant of the second vehicle 1102 to announce the approach of the emergency vehicle 1010, or any combination of thereof. In this example, the control message may include commands that specify which display, or displays, in the vehicle are utilized for the alert notification. Once the emergency vehicle 1010 passes the second vehicle 1102, the infotainment than switches/resumes the media playback as usual.

In this example, a similar procedure may also be utilized with the first vehicle 1100 where the first vehicle 1100 and RSU 1112 exchange BSM messages via BSM message signal 1126 and the RSU 1112, in response, to the BSM message signal 1126 and the EVA message 1121, produces and transmits another control message 1128 to the first vehicle 1100 and the infotainment system of the first vehicle will perform the same actions previously described in relation to the infotainment system of the second vehicle 1102. It is appreciated that in this example, since the first vehicle 1100 has line-of-sight with the emergency vehicle 1100, the first vehicle 1100 may, instead, or in combination with, perform the procedure described previously with regard to the first vehicle 1000 of FIG. 10.

Moreover, in this example, the RSU 1112 may be in signal communication with the remote entity 516 via the network 508 and may utilize the remote entity 516 to generate or assist in determining parameters for the control message 1123. Specifically, the RSU 1112 may transmit the BSM message signals 1120, 1122, and 1126 (via a request signal 1130) and the EVA message 1121 to the remote entity 516, and receive either the control message 1123 or parameters that assist the RSU in generating the control message 1123 from the remote entity 516. As an example, information received may include a determination of where and when the host vehicle (i.e., either the first vehicle 1100 or second vehicle 1102) and emergency vehicle 1110 will have an intersection (e.g., intersection 1108) of the path of travel of the emergency vehicle 1110 along the first road 1104 and either of the paths of travel of the first vehicle 1100 and/or second vehicle 1102.

In this example, a threshold could be defined by the RSU 1112 and transmitted to the second vehicle 1102. The threshold would determine at which point second vehicle 1102 has to make the adjustment instead of changing the media playback immediately as vehicles might cross each other after certain time. As described previously, the threshold communicated to second vehicle 1102 could be a timer, location, distance, or combinations of these parameters. Moreover, the RSU 1112 may be configured to update this information periodically based on the changing conditions such as (traffic, speed etc.). As an example, on the expiration of the timer or second vehicle 1102 reaching a determined position, the infotainment system of the second vehicle 1102 may adjust the media controls of the infotainment system as described previously.

Figure 12:
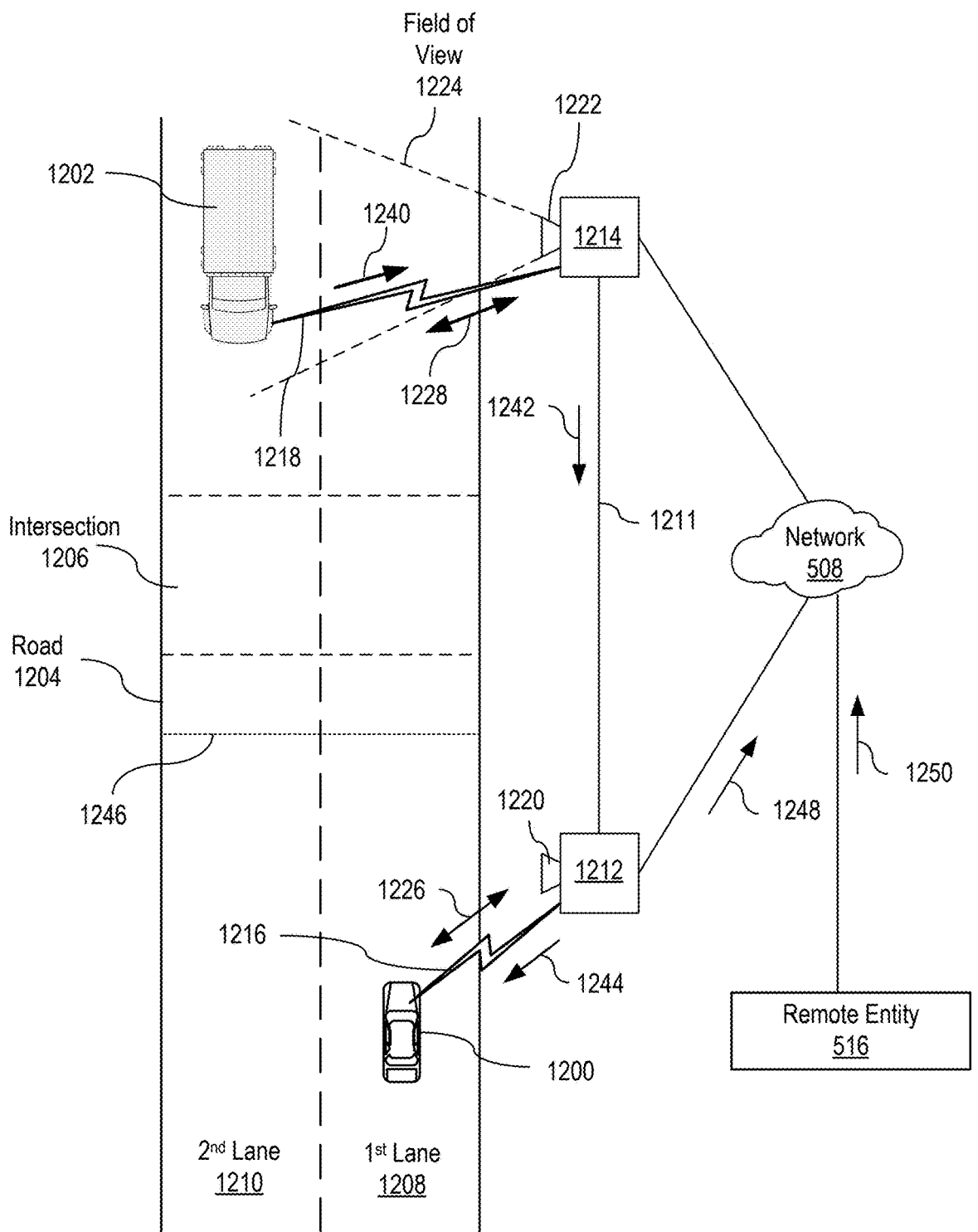
FIG. 12 is a functional block diagram an example of an implementation of the system for handling emergency vehicle alerts utilizing C-V2X techniques, shown in FIG. 5, for a road having multiple RSUs as shown in FIG. 7.

In FIG. 12, two vehicles (i.e., first vehicle 1200 and the emergency vehicle 1202) are shown traveling in opposite directions along a road 1204 towards an intersection 1206 of their respective paths of travel. In this example, the intersection 1206 is an area where the first vehicle 1200 and the emergency vehicle 1202 will pass close to each other in opposite directions along the road 1204. It is appreciated that while the first vehicle 1200 and the emergency vehicle 1202 are traveling along different lanes (i.e., a first lane 1208 for the first vehicle 1200 and a second lane 1210 for the emergency vehicle 1202), there is still the possibility of an accidently collision once the first vehicle 1200 and the emergency vehicle 1202 approach the intersection 1206 because the emergency vehicle 1202 may need to change lanes into the first lane 1208 because of environmental conditions such as, for example, construction, traffic, obstructions, etc.

In this example, it is also assumed that first vehicle 1200 may not have line-of-sight with the emergency vehicle 1202 because there relative distance to each other, a curve/bend in the road 1204, traffic, obstruction, construction, etc. As such, in this example, at least two RSUs are shown that are in signal communication with each other via signal path 1211 and/or via the network 508. Of these at least two RSUs, a first RSU 1212 may be in signal communication with the first vehicle 1200 and a second RSU 1214 may be in signal communication with the emergency vehicle 1202 via signal paths 1216 and 1218, respectively.

The first RSU 1212 may include one or more sensors 1220 and second RSU 1214 may include one or more sensors 1222. These sensors may include cameras, acoustic sensors, etc. As an example, if the one or more sensors 1222 of the second RSU 1214 includes a camera, the camera may have a field of view 1224 that is configured to capture one or more images/video of the emergency vehicle 1202 as it passes through the field of view 1224 of the camera along the road 1204.

Similar to the example described previously with regard to FIG. 11, where the first vehicle 1200 and first RSU 1212 exchange BSM messages via BSM message signal 1226, along signal path 1216; and the RSU 1212 and the emergency vehicle 1202 and second RSU 1214 also exchange BSM messages via BSM message signal 1238, along signal path 1218. The first RSU 1212 and second RSU 1214 may exchange the BSM message signals 1226 and 1238 with each other via the signal path 1211 and/or the remote entity 516 via the network 508.

If there is an emergency condition and the emergency vehicle 1202 produces an EVA message 1240 (i.e., alert signal 626), the first vehicle 1200 and first RSU 1212 may be both out of range to receive the EVA message 1240. In this situation, the second RSU 1214 may receive the EVA message 1240 and transmit the EVA message 1240 to the second RSU 1214 via the retransmitted alert signal 1242 as described previously.

As previously described, the first RSU 1212 may then be configured to receive, via an at least one transceiver (i.e., the least one transceiver 702), a safety message 703 (i.e., BSM message signal 1226) from the first vehicle 1200 approaching the first RSU 1212; receive an alert (i.e., the retransmitted alert signal 1242) of the emergency vehicle 1202 approaching the second RSU 1214; and transmit a control message 1244 (as part of a retransmitted alert signal 1242) to the first vehicle 1200 in response to receiving the alert from the second RSU 1214 (that was originally received from the emergency vehicle 1202), where the control message 1244 causes an infotainment system in the first vehicle 1200 to switch to an emergency alert mode. If the second RSU 1214 is not able to receive the BSM message signal 1228 and/or EVA message 1240 from the emergency vehicle 1202, the second RSU 1214 may utilize the one or more sensors 1222 to capture information about the emergency vehicle 1202 such as, for example, images and/or video of the emergency vehicle 1202 flashing emergency lights and/or acoustic information about the emergency vehicle 1202 such as detection of a siren being emitted by the emergency vehicle 1202. This captured information may be part of the sensing information 714, where the sensing information 714 may be part of the retransmitted alert signal 1242 in combination with, or instead of, the BSM message signal 1228.

Similar to the previous examples, a threshold could be defined by the RSU 1212 and transmitted to the first vehicle 1200. The threshold would determine at which point first vehicle 1200 has to make the adjustment instead of changing the media playback immediately. As described previously, the threshold communicated to the first vehicle 1200 could be a timer, location, distance, or combinations of these parameters. Moreover, the first RSU 1212 may be configured to update this information periodically based on the changing conditions such as (traffic, speed etc.). As an example, on the expiration of the timer or first vehicle 1200 reaching a determined position 1246 prior to the intersection 1206, the infotainment system of the first vehicle 1200 may adjust the media controls of the infotainment system as described previously.

Moreover, in this example, both the first RSU 1212 and second RSU 1214 may be in signal communication with the remote entity 516 via the network 508 and may utilize the remote entity 516 to generate or assist in determining parameters for the control message 1244. Specifically, the first RSU 1212 may transmit the BSM message signals 1226 and 1228 (via a request signal 1248) and the EVA message 1240 or the sensing information 714 to the remote entity 516, and receive either the control message 1244 or parameters that assist the RSU in generating the control message 1244 from the remote entity 516 as response signal 1250. As an example, information received may include a determination of where and when the first vehicle 1200 and emergency vehicle 1202 will have an intersection (e.g., intersection 1206) of the path of travel of the emergency vehicle 1202 along the road 1204 and path of travel of the first vehicle 1200.

Figure 13:
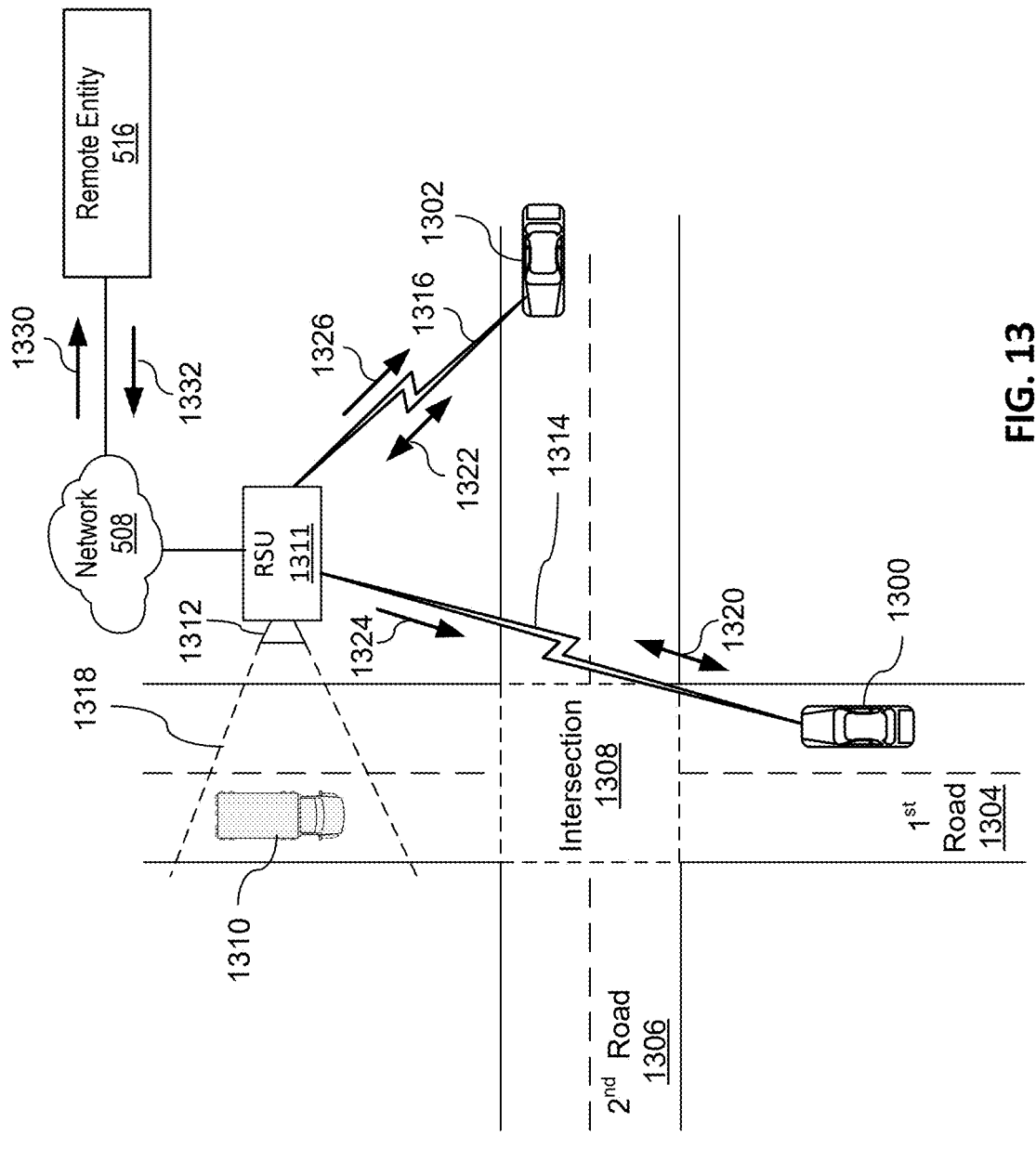
FIG. 13 is a functional block diagram an example of an implementation of the system for handling emergency vehicle alerts utilizing C-V2X techniques, shown in FIG. 5, where the emergency vehicle is not C-V2X enabled.

In FIG. 13, two vehicles (i.e., first vehicle 1300 and second vehicle 1302) are shown traveling along two roads (i.e., first road 1304 and second road 1306) towards an intersection 1308. Similar to the example described in relation to FIG. 11, also shown is an emergency vehicle 1310 traveling along the first road 1304 towards the intersection 1308 in a direction opposite the direction of the first vehicle 1300. The second vehicle 1302 is also shown traveling towards the intersection 1308 along the second road 1306. Unlike the previous examples, in this example, the emergency vehicle 1310 is not a V2X enabled vehicle.

This example is also similar to the example described in relation to FIG. 12 because an RSU 1311 is shown located along the first road 1304 close to the intersection 1308 and the RSU 1311 includes at least one sensor 1312. In this example, the at least one sensor 1312 may include, for example, a camera, for speed detection device, maps, lane information, acoustic sensor, etc., and the RSU 1311 may be located intermediate in the path of the vehicles and in direct range of first vehicle 1300 and second vehicle 1302. In this example, the at least one sensor 1312 may detect the direction, siren on, speed, size, and whether the emergency lights are on of the emergency vehicle 1202. Based on this information, the RSU 1311 may compute/determine when the first vehicle 1300 and second vehicle 1302 are going to approach the emergency vehicle 1202 in approximately opposite directions at the intersection 1308.

In this example, the RSU 1311 may be in signal communication with the first vehicle 1300, second vehicle 1302, and remote entity 516 via signal paths 1314 and 1316 and the network 508, respectively. As an example, if the at least one sensor of the RSU 1311 includes a camera, the camera may have a field of view 1318 that is configured to capture one or more images/video of the emergency vehicle 1310 as it passes through the field of view 1318 of the camera along the first road 1304.

Similar to the example described previously with regard to FIG. 11, where the first vehicle 1200, second vehicle 1302, and the RSU 1311 exchange BSM messages via BSM message signals 1320 and 1322, along signal paths 1314 and 1316. The RSU 1311 may also exchange the BSM message signals 1320 and 1322 the remote entity 516 via the network 508.

If there is an emergency condition and the emergency vehicle 1310, the at least one sensor 1312 is configured to capture sensing information 714 (i.e., detects the emergency lights, speed, siren sound, etc.) about the emergency vehicle 1310 that would allow the RSU 1311, or the RSU 1311 in combination with the remote entity 516, to determine that the emergency vehicle 1310 is responding to the emergency condition.

As previously described, the first RSU 1311 may then be configured to receive, via an at least one transceiver (i.e., the least one transceiver 702), a safety message 703 (i.e., BSM message signals 1320 and 1322) from the first vehicle 1300 and second vehicle 1302 approaching the RSU 1311; receive an alert (i.e., the sensing information 714) of the emergency vehicle 1310 approaching the RSU 1311; and transmit control messages 1324 and 1326 to the first vehicle 1300 and second vehicle 1302 in response to receiving the alert, where the control messages 1324 and 1326 causes infotainment systems within the first vehicle 1300 and second vehicle 1302 to switch to an emergency alert mode as previously described.

Similar to the previous examples, thresholds could be defined by the RSU 1311 and transmitted to the first vehicle 1300 and the second vehicle 1302. The thresholds would determine at which point the first vehicle 1300 and the second vehicle 1302 have to make the adjustments instead of changing the media playback immediately. As described previously, the thresholds communicated to the first vehicle 1300 and the second vehicle 1302 could each be a timer, location, distance, or combinations of these parameters. Moreover, the RSU 1311 may be configured to update this information periodically based on the changing conditions such as (traffic, speed etc.). As an example, on the expiration of the timer or a given vehicle (either the first vehicle 1300 and the second vehicle 1302) reaching a determined position prior to the intersection 1308, the infotainment system of the given vehicle may adjust the media controls of the infotainment system as described previously.

Moreover, in this example, both the RSU 1311 may be in signal communication with the remote entity 516 via the network 508 and may utilize the remote entity 516 to generate or assist in determining parameters for the control messages 1324 and 1326. Specifically, the RSU 1311 may transmit the BSM message signals 1320 and 1322 (via a request signal 1330) and the sensing information 714 to the remote entity 516, and receive either the control messages 1324 and 1326, or parameters that assist the RSU 1311 in generating the control messages 1324 and 1326, from the remote entity 516 as response signal 1332. As an example, information received may include a determination of where and when the first vehicle 1300, second vehicle 1302, and the emergency vehicle 1310 will have an intersection (e.g., intersection 1308) of the path of travel of the emergency vehicle 1310 along the first road 1304 and paths of travel of the first vehicle 1300 and second vehicle 1302.

Figure 14:
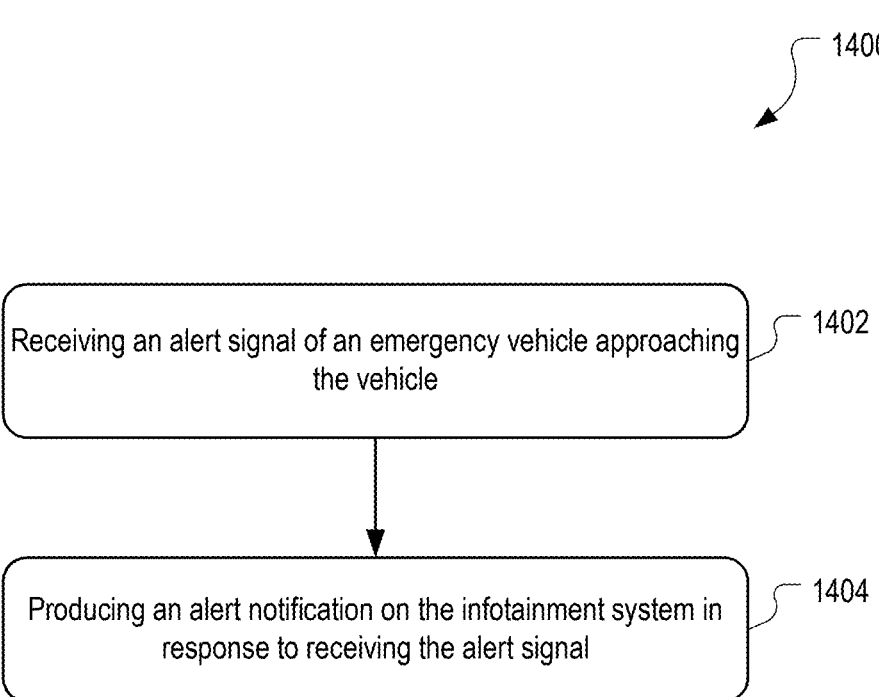
FIG. 14 is a flowchart of an example of an implementation of a method for handling emergency vehicle alerts within a vehicle.

FIG. 14 is a flowchart of an example of an implementation of a method 1400 for handling emergency vehicle 502 alerts within a vehicle 600. In this example, the method 1400 may comprise: at 1402, receiving an alert signal 626 of an emergency vehicle 502 approaching the vehicle 600; and at 1404, producing an alert notification 628 on the infotainment system 608 in response to receiving the alert signal 626.

Specifically, referring to FIG. 14, at 1402, the vehicle 600 (e.g., first vehicle 504, second vehicle 506, first vehicle 1000, second vehicle 1002, first vehicle 1100, second vehicle 1102, vehicle 1200, first vehicle 1300, or second vehicle 1302) receives the alert signal 626 of an emergency vehicle 502 approaching the vehicle 600. A means for performing the reception of the alert signal 626 may include the include the transceiver 215 of FIG. 2 or the at least one transceiver 602 of FIG. 6 in combination with the general purpose/application processor 230 of FIG. 2 or at least one processor 612 of FIG. 6.

Referring to FIG. 14, at 1404, the vehicle 600 produces the alert notification 628 on the infotainment system 608 in response to receiving the alert signal 626. A means for performing the producing 1404 the alert notification 628 may include the general purpose/application processor 230 of FIG. 2 or at least one processor 612 of FIG. 6.

In this example, receiving the alert signal may include receiving a control message and producing the alert notification may include setting the infotainment system 608 to an emergency alert mode in response to the control message. Further, receiving 1402 the control message may include receiving, via at least one transceiver 602, the control message via a unicast transmission of the alert signal. Moreover, the method 1400 may further include determining an intersection of a first path of the emergency vehicle and a second path of the vehicle based on the alert signal, where determining the intersection may include receiving the intersection from a remote entity 516.

The method 1400 may further include determining a vehicle location of the vehicle 600, where determining the vehicle location includes transmitting positional information of the vehicle 600 to the remote entity 516, receiving positional assistance data (i.e., response signal 1132, 1250, or 1332) from the remote entity 516; and receiving the alert signal 626 includes receiving the alert signal from the remote entity 516. The method 1400 may also include transmitting a safety message and the alert signal to the remote entity 516, where the safety message includes a BSM that includes a vehicle speed, a vehicle heading of the vehicle 600, and a location of the vehicle 600.

In this example, the emergency alert mode causes the infotainment system 608 to perform operations that include, for example, pausing any media playback, reducing audio volume, displaying a location of the emergency vehicle, announcing with a voice assistant the approach of the emergency vehicle, or any combination thereof. In this example, displaying the location of the emergency vehicle 502 may include causing the infotainment system 608 to display the location of the emergency vehicle 502 on a main display of the infotainment system 608.

Furthermore, the method 1400 may also include determining a threshold for setting the infotainment system 608 to the emergency alert mode, and producing the alert notification 628 on the infotainment system 608 in response to the control message triggering the threshold. As an example, the threshold may be a timer value, a first location value for the location of the vehicle, a second location value for the location of the emergency vehicle, a distance value between the first location value and second location value, or any combination thereof. In this example, the threshold may be updated based on changing conditions, and the conditions that include traffic conditions, a first speed of the vehicle, and a second speed of the second vehicle.

The method 1400 may also include transmitting a safety message to the RSU 700, where receiving the alert signal includes receiving the alert signal from the RSU 700, receiving the alert signal includes receiving the control message, and producing the alert notification 628 includes setting the infotainment system 608 to an emergency alert mode in response to the control message.

Figure 15:
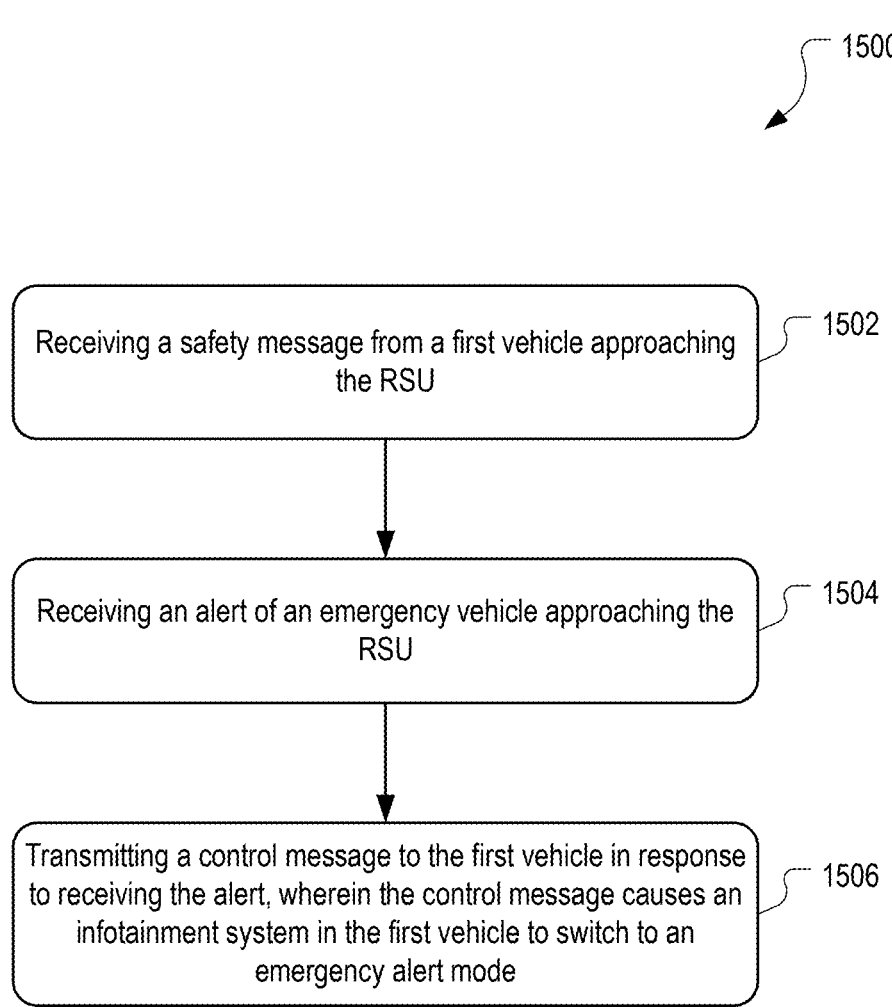
FIG. 15 is a flowchart of an example of an implementation of a method for handling emergency vehicle alerts in an RSU.

FIG. 15 is a flowchart of an example of an implementation of a method 1500 for handling emergency vehicle 502 alerts in an RSU 700. The method 1500 comprises: at 1502, receiving, with the at least one transceiver 702, a safety message 703 from a first vehicle (i.e., vehicle 600) approaching the RSU 700; at 1504, detecting an emergency vehicle approaching the RSU; and at 1506, transmitting an alert message to the first vehicle in response to detecting the emergency vehicle, wherein the alert message causes an infotainment system in the first vehicle to switch to an emergency alert mode. In this example, the alert message may be part of the retransmitted alert signal 716 shown in FIG. 7, and the alert may include the alert signal 626 and/or sensing information 714 produced by the at least one sensor 712.

Specifically, referring to FIG. 15, at 1502, the RSU 700 (e.g., TRP 300, RSU 514, RSU 1112, RSU 1212, RSU 1214, or RSU 1311), at 1502, receives the safety message (e.g., safety message 703, BSM message signal 1120, BSM message signal 1122, BSM message signal 1126, BSM message signal 1226, BSM message signal 1228, BSM message signal 1320, or BSM message signal 1322) from the first vehicle (e.g., first vehicle 504, second vehicle 506, first vehicle 1000, second vehicle 1002, first vehicle 1100, second vehicle 1102, vehicle 1200, first vehicle 1300, or second vehicle 1302) approaching the RSU 700. A means for performing the reception of the safety message may include the include the transceiver 315 of FIG. 3, or the at least one transceiver 702 of FIG. 7 in combination with the processor 310 of FIG. 3 or at least one processor 706 of FIG. 7.

Referring to FIG. 15, at 1504, the RSU 700 receives, with the at least one transceiver 702, the alert of an emergency vehicle (e.g., emergency vehicle 502) approaching the RSU 700. As an example, the RSU may be configured to receive the alert via the alert signal 626 of FIG. 7. A means for performing the reception of the safety message may include the include the transceiver 315 of FIG. 3, or the at least one transceiver 702 of FIG. 7 in combination with the processor 310 of FIG. 3 or at least one processor 706 of FIG. 7.

Referring to FIG. 15, at 1506, the RSU 700 transmits a control message to the first vehicle in response to receiving the alert, where the control message causes the infotainment system (e.g., infotainment system 528, infotainment system 608, or infotainment system 900) in the first vehicle to switch to an emergency alert mode. A means for performing the transmission of the control message to the first vehicle may include the transceiver 315 of FIG. 3, or the at least one transceiver 702 of FIG. 7 in combination with the processor 310 of FIG. 3 or at least one processor 706 of FIG. 7.

In this example, causing the causing the infotainment system 608 in the vehicle 600 to switch to the emergency alert mode includes causing the infotainment system 608 to pause any media playback, reduce audio volume, graphically display a location of the emergency vehicle, and use a voice assistant to announce an approach of the emergency vehicle 502, or any combination of thereof.

IMPLEMENTATION EXAMPLES

Implementation examples are provided in the following numbered clauses.

Clause 1. A method for handling emergency vehicle alerts within a vehicle having an infotainment system, the method comprising: receiving an alert signal of an emergency vehicle approaching the vehicle; and producing an alert notification on the infotainment system in based on the alert signal.

Clause 2. The method of clause 1, wherein receiving the alert signal includes receiving a control message and producing the alert notification includes setting the infotainment system to an emergency alert mode in response to the control message.

Clause 3. The method of clause 2, wherein receiving the control message includes receiving, via at least one receiver, the control message via a unicast transmission of the alert signal.

Clause 4. The method of clause 2, further including determining an intersection of a first path of the emergency vehicle and a second path of the vehicle based on the alert signal.

Clause 5. The method of clause 4, wherein determining the intersection includes receiving intersection information from a remote entity.

Clause 6. The method of clause 5, further including determining a vehicle location of the vehicle, wherein determining the vehicle location includes transmitting positional information of the vehicle to the remote entity, and receiving the alert signal includes receiving the alert signal from the remote entity.

Clause 7. The method of clause 5, further including transmitting a safety message and the alert signal to the remote entity, wherein the safety message includes a basic safety message (BSM) that includes a vehicle speed, a vehicle heading of the vehicle, and a location of the vehicle.

Clause 8. The method of clause 2, wherein the emergency alert mode causes the infotainment system to perform operations selected from the group consisting of pausing any media playback, reducing audio volume, displaying a location of the emergency vehicle, and announcing with a voice assistant the approach of the emergency vehicle.

Clause 9. The method of clause 8, wherein displaying the location of the emergency vehicle includes causing the infotainment system to display the location of the emergency vehicle on a main display of the infotainment system.

Clause 10. The method of clause 2, further including: determining a threshold for setting the infotainment system to the emergency alert mode, and wherein producing the alert notification on the infotainment system comprises producing the alert notification in response to the control message triggering the threshold.

Clause 11. The method of clause 10, wherein the threshold is selected from the group consisting of a timer value, a first location value for a location of the vehicle, a second location value for the location of the emergency vehicle, and a distance value between the first location value and the second location value.

Clause 12. The method of clause 11, wherein the threshold is updated based on changing conditions, and the conditions are selected from the group consisting of traffic conditions, a first speed of the vehicle, a second speed of a second vehicle, a first heading of the vehicle, and a second heading of the second vehicle.

Clause 13. The method of clause 2, wherein setting the infotainment system to the emergency alert mode includes displaying a map that includes a first position of the vehicle and a second position of the emergency vehicle.

Clause 14. The method of clause 1, further including transmitting a safety message to a roadside unit (RSU), wherein receiving the alert signal includes receiving the alert signal from the RSU, receiving the alert signal includes receiving a control message, and producing the alert notification includes setting the infotainment system to an emergency alert mode in response to the control message.

Clause 15. The method of clause 14, wherein the safety message includes a first basic safety message (BSM), the alert signal includes the control message and an emergency vehicle alert (EVA), a second BSM, or both, the first BSM includes a vehicle speed, a vehicle heading of the vehicle, and a location of the vehicle, and the second BSM includes a speed of the emergency vehicle, a heading of the emergency vehicle, and a location of the emergency vehicle.

Clause 16. The method of clause 15, further includes determining a threshold for setting the infotainment system to the emergency alert mode, and producing the alert notification on the infotainment system in response to the control message triggering the threshold.

Clause 17. The method of clause 16, wherein the threshold is selected from the group consisting of a timer value, a first location value for the location of the vehicle, a second location value for the location of the emergency vehicle, and a distance value between the first location value and the second location value.

Clause 18. The method of clause 17, wherein the threshold is updated based on changing conditions, and the conditions are selected from the group consisting of traffic conditions, a first speed of the vehicle, and a second speed of a second vehicle.

Clause 19. The method of clause 14, wherein the safety message includes a first basic safety message (BSM) having a vehicle speed, a vehicle heading of the vehicle, and a location of the vehicle, the alert signal includes sensing information of the emergency vehicle produced by at least one sensor of the RSU, and the sensing information is selected from a group consisting of one or more images of the emergency vehicle, a size of the emergency vehicle, a speed of the emergency vehicle, a heading of the emergency vehicle, a location of the emergency vehicle, and a detected siren sound of the emergency vehicle.

Clause 20. The method of clause 14, wherein the safety message includes a first basic safety message (BSM) having a vehicle speed, a vehicle heading of the vehicle, and a location of the vehicle, the alert signal includes sensing information of the emergency vehicle produced by at least one sensor of a second RSU and transmitted to the RSU, and the sensing information is selected from a group consisting of one or more images of the emergency vehicle, a size of the emergency vehicle, a speed of the emergency vehicle, a heading of the emergency vehicle, a location of the emergency vehicle, and detected siren sound of the emergency vehicle.

Clause 21. The method of clause 14, further including determining an intersection of a first path of the emergency vehicle and a second path of the vehicle based on the alert signal.

Clause 22. The method of clause 21, wherein determining the intersection includes transmitting the safety message and the alert signal to a remote entity, and receiving the intersection from the remote entity.

Clause 23. An apparatus of a vehicle for handling received emergency vehicle alerts, wherein the vehicle is an ego vehicle, the apparatus comprising: at least one transceiver; at least one memory; and at least one processor, in signal communication with the at least one transceiver, and the at least one memory, the at least one processor configured to: receive an alert signal of an emergency vehicle approaching the ego vehicle; and produce an alert notification on an infotainment system based on the alert signal.

Clause 24. The apparatus of clause 23, wherein the at least one processor is configured to receive the alert signal by further being configured to receive a control message and produce the alert notification by further being configured to set the infotainment system to an emergency alert mode in response to the control message.

Clause 25. The apparatus of clause 24, wherein the at least one processor is configured to receive the control message by further being configured to receive, via the at least one transceiver, the control message via a unicast transmission of the alert signal.

Clause 26. The apparatus of clause 24, wherein the at least one processor is further configured to determine an intersection of a first path of the emergency vehicle and a second path of the ego vehicle based on the alert signal.

Clause 27. The apparatus of clause 26, wherein the at least one processor is configured to determine the intersection by further being configured to receive, via the at least one transceiver, intersection information from a remote entity.

Clause 28. The apparatus of clause 27, wherein the at least one processor is further configured to determine a vehicle location of the ego vehicle, wherein the at least one processor is configured to determine the vehicle location by further being configured to transmit, via the at least one transceiver, positional information of the ego vehicle to the remote entity, and the at least one processor is configured to receive the alert signal by further being configured to receive the alert signal from the remote entity.

Clause 29. The apparatus of clause 27, wherein the at least one processor is further configured to transmit a safety message and the alert signal to the remote entity, wherein the safety message includes a basic safety message (BSM) that includes a vehicle speed, a vehicle heading of the vehicle, and a location of the ego vehicle.

Clause 30. The apparatus of clause 24, wherein the emergency alert mode is configured to cause the at least one processor to perform operations selected from the group consisting of pause any media playback, reduce audio volume, display an alert message on a display of the infotainment system, display a location of the emergency vehicle on the display of the infotainment system, and announce with a voice assistant the approach of the emergency vehicle.

Clause 31. The apparatus of clause 30, wherein the at least one processor is configured to display the location of the emergency vehicle by further being configured to display the location of the emergency vehicle on a main display of the infotainment system.

Clause 32. The apparatus of clause 24, wherein the at least one processor is further configured to determine a threshold for setting the infotainment system to the emergency alert mode, and wherein the at least one processor is configured to produce the alert notification on the infotainment system by further being configured to produce the alert notification in response to the control message triggering the threshold.

Clause 33. The apparatus of clause 32, wherein the threshold is selected from the group consisting of a timer value, a first location value for the location of the ego vehicle, a second location value for the location of the emergency vehicle, and a distance value between the first location value and the second location value.

Clause 34. The apparatus of clause 33, wherein the threshold is updated based on changing conditions, and the conditions are selected from the group consisting of traffic conditions, a first speed of the ego vehicle, a second speed of a second vehicle, and a first heading of the ego vehicle, and a second heading of the second vehicle.

Clause 35. The apparatus of clause 23, wherein the at least one processor is further configured to transmit a safety message to a roadside unit (RSU), wherein the at least one processor is configured to receive the alert signal by further being configured to receive the alert signal from the RSU, wherein the alert signal includes a control message, and produce the alert notification by further being configured to set the infotainment system to an emergency alert mode in response to the control message.

Clause 36. The apparatus of clause 35, wherein the safety message includes a first basic safety message (BSM), the at least one processor is configured to receive the alert signal by further being configured to receive the control message, the alert signal includes the control message and an emergency vehicle alert (EVA), a second BSM, or both, the first BSM includes a vehicle speed, a vehicle heading of the vehicle, and a location of the ego vehicle, and the second BSM includes a speed of the emergency vehicle, a heading of the emergency vehicle, and a location of the emergency vehicle.

Clause 37. The apparatus of clause 36, wherein the at least one processor is further configured to receive a threshold, from the RSU, for setting the infotainment system to the emergency alert mode, and produce the alert notification on the infotainment system in response to the control message triggering the threshold.

Clause 38. The apparatus of clause 37, wherein the threshold is selected from the group consisting of a timer value, a first location value for the location of the ego vehicle, a second location value for the location of the emergency vehicle, and a distance value between the first location value and the second location value.

Clause 39. The apparatus of clause 38, wherein the threshold is updated based on changing conditions, and the conditions are selected from the group consisting of traffic conditions, a first speed of the ego vehicle, and a second speed of a second vehicle.

Clause 40. The apparatus of clause 35, wherein the safety message includes a first basic safety message (BSM) having a vehicle speed, a vehicle heading of the ego vehicle, and a location of the ego vehicle, the alert signal includes sensing information of the emergency vehicle produced by at least one sensor of the RSU, and the sensing information is selected from a group consisting of one or more images of the emergency vehicle, a size of the emergency vehicle, a speed of the emergency vehicle, a heading of the emergency vehicle, a location of the emergency vehicle, and detected siren sound of the emergency vehicle.

Clause 41. The apparatus of clause 35, wherein the safety message includes a first basic safety message (BSM) having a vehicle speed, a vehicle heading of the ego vehicle, and a location of the ego vehicle, the alert signal includes sensing information of the emergency vehicle produced by at least one sensor of a second RSU and transmitted to the RSU, and the sensing information is selected from a group consisting of one or more images of the emergency vehicle, a size of the emergency vehicle, a speed of the emergency vehicle, a heading of the emergency vehicle, a location of the emergency vehicle, and detected siren sound of the emergency vehicle.

Clause 42. The apparatus of clause 35, wherein the at least one processor is further configured to determine an intersection of a first path of the emergency vehicle and a second path of the ego vehicle based on the alert signal.

Clause 43. The apparatus of clause 42, wherein the at least one processor is configured to determining the intersection by further being configured to transmit the safety message and the alert signal to a remote entity, and receive the intersection from the remote entity.

Clause 44. The apparatus of clause 35, wherein the at least one processor is configured to set the infotainment system to the emergency alert mode by further being configured to display a map that includes a first position of the ego vehicle and a second position of the emergency vehicle.

Clause 45. A method for handling emergency vehicle alerts in a roadside unit (RSU), the method comprising: receiving, with at least one transceiver, a safety message from a first vehicle approaching the RSU; receiving, with the at least one transceiver, an alert of an emergency vehicle approaching the RSU; and transmitting a control message to the first vehicle based on the alert, wherein the control message causes an infotainment system in the first vehicle to switch to an emergency alert mode.

Clause 46. The method of clause 45, wherein causing the infotainment system in the first vehicle to switch to the emergency alert mode includes causing the infotainment system to operate in a manner selected from the group consisting of pausing any media playback, reducing audio volume, graphically displaying a location of the emergency vehicle, and using a voice assistant to announce an approach of the emergency vehicle.

Clause 47. The method of clause 46, wherein causing the infotainment system in the first vehicle to switch to the emergency alert mode further includes causing the infotainment system to graphically display the location of the emergency vehicle on a main display of the infotainment system.

Clause 48. The method of clause 45, wherein transmitting the control message to the first vehicle includes transmitting the control message via a unicast transmission.

Clause 49. The method of clause 45, further including determining an intersection of a first path of the emergency vehicle and a second path of the first vehicle based on the safety message and the alert.

Clause 50. The method of clause 49, wherein the safety message includes a first basic safety message (BSM), the alert includes an alert signal including an emergency vehicle alert (EVA), a second BSM, or both, the first BSM includes a speed of the first vehicle, heading of the first vehicle, and a location of the first vehicle, and the second BSM includes a speed of the emergency vehicle, a heading of the emergency vehicle, and a location of the emergency vehicle.

Clause 51. The method of clause 50, further includes determining a threshold value for causing the infotainment system in the first vehicle to switch to the emergency alert mode, and transmitting the threshold value as part of the control message.

Clause 52. The method of clause 51, wherein the threshold value is selected from the group consisting of a timer value, a first location value for the location of the first vehicle, a second location value for the location of the emergency vehicle, and a distance value between the first location value and the second location value.

Clause 53. The method of clause 52, wherein the threshold value is updated based on changing conditions, and the conditions are selected from the group consisting of traffic conditions, a first speed of the first vehicle, and a second speed of a second vehicle.

Clause 54. The method of clause 49, wherein the safety message includes a first basic safety message (BSM), the alert includes sensing information of the emergency vehicle, the first BSM includes a speed of the first vehicle, heading of the first vehicle, and a location of the first vehicle, receiving the alert of the emergency vehicle approaching the RSU includes sensing the emergency vehicle with a sensor to produce the sensing information, and the sensing information is selected from a group consisting of one or more images of the emergency vehicle, a size of the emergency vehicle, a speed of the emergency vehicle, a heading of the emergency vehicle, a location of the emergency vehicle, and detected siren sound.

Clause 55. The method of clause 54, wherein transmitting the control message to the first vehicle in response to receiving the alert includes transmitting the control message to the first vehicle via a second RSU.

Clause 56. The method of clause 54, further including receiving a second safety message from a second vehicle approaching the RSU; transmitting a second control message to the second vehicle in response to receiving the alert, wherein the second control message causes a second infotainment system in the second vehicle to switch to the emergency alert mode.

Clause 57. The method of clause 49, wherein determining the intersection includes transmitting the safety message and the alert to a remote entity, and receiving the intersection from the remote entity.

Clause 58. A roadside unit (RSU) comprising: at least one transceiver; at least one memory; and at least one processor, in signal communication with the at least one transceiver, and the at least one memory, the at least one processor configured to: receive, via the at least one transceiver, a safety message from a first vehicle approaching the RSU; receive, via the at least one transceiver, an alert of an emergency vehicle approaching the RSU; and transmit, via the at least one transceiver, a control message to the first vehicle based on the alert, wherein the control message causes an infotainment system in the first vehicle to switch to an emergency alert mode.

Clause 59. The RSU of clause 58, wherein the control message causes the infotainment system in the first vehicle to switch to the emergency alert mode by causing the infotainment system to operate in a manner selected from the group consisting of pausing any media playback, reducing audio volume, graphically displaying a location of the emergency vehicle, and using a voice assistant to announce an approach of the emergency vehicle.

Clause 60. The RSU of clause 59, wherein the control message causes the infotainment system in the first vehicle to switch to the emergency alert mode by further causing the infotainment system to graphically display the location of the emergency vehicle on a main display of the infotainment system.

Clause 61. The RSU of clause 58, wherein the at least one processor is configured to transmit the control message to the first vehicle by further being configured to transmit, via the at least one transceiver, the control message via a unicast transmission.

Clause 62. The RSU of clause 58, wherein the at least one processor is further configured to determining an intersection of a first path of the emergency vehicle and a second path of the first vehicle based on the safety message and the alert.

Clause 63. The RSU of clause 62, wherein the safety message includes a first basic safety message (BSM), the alert includes an alert signal including an emergency vehicle alert (EVA), a second BSM, or both, the first BSM includes a speed of the first vehicle, heading of the first vehicle, and a location of the first vehicle, and the second BSM includes a speed of the emergency vehicle, a heading of the emergency vehicle, and a location of the emergency vehicle.

Clause 64. The RSU of clause 63, wherein the at least one processor is further configured to determine a threshold value for causing the infotainment system in the first vehicle to switch to the emergency alert mode, and transmit the threshold value as part of the control message.

65. The RSU of clause 64, wherein the threshold value is selected from the group consisting of a timer value, a first location value for the location of the first vehicle, a second location value for the location of the emergency vehicle, and a distance value between the first location value and the second location value.

Clause 66. The RSU of clause 65, wherein the threshold value is updated based on changing conditions, and the conditions are selected from the group consisting of traffic conditions, a first speed of the first vehicle, and a second speed of a second vehicle.

Clause 67. The RSU of clause 62, further including at least one sensor, wherein the safety message includes a first basic safety message (BSM), the alert includes sensing information of the emergency vehicle, the first BSM includes a speed of the first vehicle, heading of the first vehicle, and a location of the first vehicle, the at least one processor is configured to receive the alert of the emergency vehicle approaching the RSU by further being configured to sense the emergency vehicle with the at least one sensor to produce the sensing information, and the sensing information is selected from a group consisting of one or more images of the emergency vehicle, a size of the emergency vehicle, a speed of the emergency vehicle, a heading of the emergency vehicle, a location of the emergency vehicle, and detected siren sound.

Clause 68. The RSU of clause 67, wherein the at least one processor is configured to transmit the control message to the first vehicle by further being configured to transmit the control message to the first vehicle via a second RSU.

Clause 69. The RSU of clause 67, wherein the at least one processor is further configured to receive a second safety message from a second vehicle approaching the RSU; transmit a second control message to the second vehicle in response to receiving the alert, wherein the second control message causes a second infotainment system in the second vehicle to switch to the emergency alert mode.

Clause 70. The RSU of clause 62, wherein the at least one processor is configured to determine the intersection by further being configured to transmit the safety message and the alert to a remote entity, and receive the intersection from the remote entity.

Clause 71. An apparatus for handling emergency vehicle alerts within a vehicle having an infotainment system, the apparatus comprising: means for receiving an alert signal of an emergency vehicle approaching the vehicle; and means for producing an alert notification on the infotainment system based on the alert signal.

Clause 72. The apparatus of clause 71, wherein means for receiving the alert signal includes means for receiving a control message and means for producing the alert notification includes means for setting the infotainment system to an emergency alert mode in response to the control message.

Clause 73. The apparatus of clause 72, wherein means for receiving the control message includes means for receiving the control message via a unicast transmission of the alert signal.

Clause 74. The apparatus of clause 72, further including means for determining an intersection of a first path of the emergency vehicle and a second path of the vehicle based on the alert signal.

Clause 75. The apparatus of clause 74, wherein means for determining the intersection includes means for receiving the intersection from a remote entity.

Clause 76. The apparatus of clause 75, further including means for determining a vehicle location of the vehicle, wherein means for determining the vehicle location includes means for transmitting positional information of the vehicle to the remote entity, means for receiving positional assistance data from the remote entity, and means for receiving the alert signal includes receiving the alert signal from the remote entity.

Clause 77. The apparatus of clause 75, further including means for transmitting a safety message and the alert signal to the remote entity, wherein the safety message includes a basic safety message (BSM) that includes a vehicle speed, a vehicle heading of the vehicle, and a location of the vehicle.

Clause 78. The apparatus of clause 72, wherein the emergency alert mode causes the infotainment system to perform operations selected from the group consisting of pausing any media playback, reducing audio volume, displaying a location of the emergency vehicle, and announcing with a voice assistant the approach of the emergency vehicle.

Clause 79. The apparatus of clause 78, wherein displaying the location of the emergency vehicle includes causing the infotainment system to display the location of the emergency vehicle on a main display of the infotainment system.

Clause 80. The apparatus of clause 72, further includes means for determining a threshold for setting the infotainment system to the emergency alert mode, and means for producing the alert notification on the infotainment system in response to the control message triggering the threshold.

Clause 81. The apparatus of clause 80, wherein the threshold is selected from the group consisting of a timer value, a first location value for the location of the vehicle, a second location value for the location of the emergency vehicle, and a distance value between the first location value and the second location value.

Clause 82. The apparatus of clause 81, wherein the threshold is updated based on changing conditions, and the conditions are selected from the group consisting of traffic conditions, a first speed of the vehicle, and a second speed of a second vehicle.

Clause 83. The apparatus of clause 72, further including means for transmitting a safety message to a roadside unit (RSU), wherein means for receiving the alert signal includes means for receiving the alert signal from the RSU, and means for producing the alert notification includes setting the infotainment system to the emergency alert mode in response to the control message.

Clause 84. A non-transitory processor-readable storage medium comprising processor-readable instructions configured to cause one or more processors of an apparatus to handle emergency vehicle alerts within a vehicle having an infotainment system, comprising: code for receiving an alert signal of an emergency vehicle approaching the vehicle; and code for producing an alert notification on the infotainment system based on the alert signal.

Clause 85. A roadside unit (RSU) comprising: means for receiving, with at least one transceiver, a safety message from a first vehicle approaching the RSU; means for receiving, with the at least one transceiver, an alert of an emergency vehicle approaching the RSU; and means for transmitting a control message to the first vehicle based on the alert, wherein the control message causes an infotainment system in the first vehicle to switch to an emergency alert mode.

Clause 86. The RSU of clause 85, wherein causing the infotainment system in the first vehicle to switch to the emergency alert mode includes causing the infotainment system to operate in a manner selected from the group consisting of pausing any media playback, reducing audio volume, graphically displaying a location of the emergency vehicle, and using a voice assistant to announce an approach of the emergency vehicle.

Clause 87. The RSU of clause 86, wherein causing the infotainment system in the first vehicle to switch to the emergency alert mode further includes causing the infotainment system to graphically display the location of the emergency vehicle on a main display of the infotainment system.

Clause 88. The RSU of clause 85, wherein means for transmitting the control message to the first vehicle includes means for transmitting the control message via a unicast transmission.

Clause 89. The RSU of clause 85, further including means for determining an intersection of a first path of the emergency vehicle and a second path of the first vehicle based on the safety message and the alert.

Clause 90. The RSU of clause 89, wherein the safety message includes a first basic safety message (BSM), the alert includes an alert signal including an emergency vehicle alert (EVA), a second BSM, or both, the first BSM includes a speed of the first vehicle, heading of the first vehicle, and a location of the first vehicle, and the second BSM includes a speed of the emergency vehicle, a heading of the emergency vehicle, and a location of the emergency vehicle.

Clause 91. The RSU of clause 90, further includes means for determining a threshold value for causing the infotainment system in the first vehicle to switch to the emergency alert mode, and means for transmitting the threshold value as part of the control message.

Clause 92. The RSU of clause 91, wherein the threshold value is selected from the group consisting of a timer value, a first location value for the location of the first vehicle, a second location value for the location of the emergency vehicle, and a distance value between the first location value and the second location value.

Clause 93. The RSU of clause 92, wherein the threshold value is updated based on changing conditions, and the conditions are selected from the group consisting of traffic conditions, a first speed of the first vehicle, and a second speed of a second vehicle.

Clause 94. The RSU of clause 89, wherein the safety message includes a first basic safety message (BSM), the alert includes sensing information of the emergency vehicle, the first BSM includes a speed of the first vehicle, heading of the first vehicle, and a location of the first vehicle, means for receiving the alert of the emergency vehicle approaching the RSU includes means for sensing the emergency vehicle with a sensor to produce the sensing information, and the sensing information is selected from a group consisting of one or more images of the emergency vehicle, a size of the emergency vehicle, a speed of the emergency vehicle, a heading of the emergency vehicle, a location of the emergency vehicle, and detected siren sound.

Clause 95. The RSU of clause 94, wherein means for transmitting the control message to the first vehicle in response to receiving the alert includes means for transmitting the control message to the first vehicle via a second RSU.

Clause 96. The RSU of clause 94, further including means for receiving a second safety message from a second vehicle approaching the RSU; means for transmitting a second control message to the second vehicle in response to receiving the alert, wherein the second control message causes a second infotainment system in the second vehicle to switch to the emergency alert mode.

Clause 97. The RSU of clause 89, wherein means for determining the intersection includes means for transmitting the safety message and the alert to a remote entity, and means for receiving the intersection from the remote entity.

Clause 98. A non-transitory processor-readable storage medium comprising processor-readable instructions configured to cause one or more processors of a roadside unit (RSU) to handle emergency vehicle alerts, comprising: code for receiving, with at least one transceiver, a safety message from a first vehicle approaching the RSU; code for receiving, with the at least one transceiver, an alert of an emergency vehicle approaching the RSU; and code for transmitting a control message to the first vehicle based on the alert, wherein the control message causes an infotainment system in the first vehicle to switch to an emergency alert mode.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes at least one, i.e., one or more, of such devices (e.g., "a processor" includes at least one processor (e.g., one processor, two processors, etc.), "the processor" includes at least one processor, "a memory" includes at least one memory, "the memory" includes at least one memory, etc.). The phrases "at least one" and "one or more" are used interchangeably and such that "at least one" referred-to object and "one or more" referred-to objects include implementations that have one referred-to object and implementations that have multiple referred-to objects. For example, "at least one processor" and "one or more processors" each includes implementations that have one processor and implementations that have multiple processors.

The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

What is claimed is:

1. A method for handling emergency vehicle alerts within an ego vehicle having an infotainment system, the method comprising:

receiving an alert signal of an emergency vehicle approaching the ego vehicle; and producing an alert notification on the infotainment system based on the alert signal.

2. The method of claim 1, wherein receiving the alert signal includes receiving a control message and producing the alert notification includes setting the infotainment system to an emergency alert mode in response to the control message.

3. The method of claim 2, wherein the emergency alert mode causes the infotainment system to perform operations selected from the group consisting of pausing any media playback, reducing audio volume, displaying a location of the emergency vehicle, and announcing with a voice assistant the approach of the emergency vehicle.

4. The method of claim 2, further including:

determining a threshold for setting the infotainment system to the emergency alert mode, and wherein producing the alert notification on the infotainment system comprises producing the alert notification in response to the control message triggering the threshold.

5. The method of claim 4, wherein the threshold is selected from the group consisting of a timer value, a first location value for a location of the ego vehicle, a second location value for the location of the emergency vehicle, and a distance value between the first location value and the second location value.

6. The method of claim 5, wherein the threshold is updated based on changing conditions, and the conditions are selected from the group consisting of traffic conditions, a first speed of the ego vehicle, a second speed of a second vehicle, a first heading of the ego vehicle, and a second heading of the second vehicle.

7. The method of claim 1, further including transmitting a safety message to a roadside unit (RSU), wherein receiving the alert signal includes receiving the alert signal from the RSU, receiving the alert signal includes receiving a control message, and producing the alert notification includes setting the infotainment system to an emergency alert mode in response to the control message.

8. The method of claim 7, wherein the safety message includes a first basic safety message (BSM), the alert signal includes the control message and an emergency vehicle alert (EVA), a second BSM, or both, the first BSM includes a vehicle speed, a vehicle heading of the ego vehicle, and a location of the ego vehicle, and the second BSM includes a speed of the emergency vehicle, a heading of the emergency vehicle, and a location of the emergency vehicle.

9. The method of claim 7, wherein the safety message includes a first basic safety message (BSM) having a vehicle speed, a vehicle heading of the ego vehicle, and a location of the vehicle, the alert signal includes sensing information of the emergency vehicle produced by at least one sensor of the RSU or at least one sensor of a second RSU and transmitted to the RSU, and the sensing information is selected from a group consisting of one or more images of the emergency vehicle, a size of the emergency vehicle, a speed of the emergency vehicle, a heading of the emergency vehicle, a location of the emergency vehicle, and a detected siren sound of the emergency vehicle.

10. An apparatus of a vehicle for handling received emergency vehicle alerts, wherein the vehicle is an ego vehicle, the apparatus comprising:

at least one transceiver;

at least one memory; and at least one processor, in signal communication with the at least one transceiver, and the at least one memory, the at least one processor configured to:

receive an alert signal of an emergency vehicle approaching the ego vehicle; and produce an alert notification on an infotainment system based on the alert signal.

11. The apparatus of claim 10, wherein the at least one processor is configured to receive the alert signal by further being configured to receive a control message and produce the alert notification by further being configured to set the infotainment system to an emergency alert mode in response to the control message.

12. The apparatus of claim 11, wherein the emergency alert mode is configured to cause the at least one processor to perform operations selected from the group consisting of pause any media playback, reduce audio volume, display an alert message on a display of the infotainment system, display a location of the emergency vehicle on the display of the infotainment system, and announce with a voice assistant the approach of the emergency vehicle.

13. The apparatus of claim 11, wherein the at least one processor is further configured to determine a threshold for setting the infotainment system to the emergency alert mode, and wherein the at least one processor is configured to produce the alert notification on the infotainment system by further being configured to produce the alert notification in response to the control message triggering the threshold.

14. The apparatus of claim 13, wherein the threshold is selected from the group consisting of a timer value, a first location value for the location of the ego vehicle, a second location value for the location of the emergency vehicle, and a distance value between the first location value and the second location value.

15. The apparatus of claim 14, wherein the threshold is updated based on changing conditions, and the conditions are selected from the group consisting of traffic conditions, a first speed of the ego vehicle, a second speed of a second vehicle, and a first heading of the ego vehicle, and a second heading of the second vehicle.

16. The apparatus of claim 10, wherein the at least one processor is further configured to transmit a safety message to a roadside unit (RSU), wherein the at least one processor is configured to receive the alert signal by further being configured to receive the alert signal from the RSU, wherein the alert signal includes a control message, and produce the alert notification by further being config-ured to set the infotainment system to an emergency alert mode in response to the control message.

17. The apparatus of claim 16, wherein the safety message includes a first basic safety message (BSM), the at least one processor is configured to receive the alert signal by further being configured to receive the control message, the alert signal includes the control message and an emergency vehicle alert (EVA), a second BSM, or both, the first BSM includes a vehicle speed, a vehicle heading of the ego vehicle, and a location of the ego vehicle, and the second BSM includes a speed of the emergency vehicle, a heading of the emergency vehicle, and a location of the emergency vehicle.

18. The apparatus of claim 16, wherein the safety message includes a first basic safety message (BSM) having a vehicle speed, a vehicle heading of the ego vehicle, and a location of the ego vehicle, the alert signal includes sensing information of the emer-gency vehicle produced by at least one sensor of the RSU or at least one sensor of a second RSU and transmitted to the RSU, and the sensing information is selected from a group consist-ing of one or more images of the emergency vehicle, a size of the emergency vehicle, a speed of the emergency vehicle, a heading of the emergency vehicle, a location of the emergency vehicle, and detected siren sound of the emergency vehicle.

19. A method for handling emergency vehicle alerts in a roadside unit (RSU), the method comprising:

receiving, with at least one transceiver, a safety message from a first vehicle approaching the RSU;

receiving, with the at least one transceiver, an alert of an emergency vehicle approaching the RSU; and transmitting a control message to the first vehicle based on the alert, wherein the control message causes an infotainment system in the first vehicle to switch to an emergency alert mode.

20. The method of claim 19, wherein causing the info-tainment system in the first vehicle to switch to the emer-gency alert mode includes causing the infotainment system to operate in a manner selected from the group consisting of pausing any media playback, reducing audio volume, graphically displaying a location of the emergency vehicle, and using a voice assistant to announce an approach of the emergency vehicle.

21. The method of claim 20, wherein the safety message includes a first basic safety message (BSM), the alert includes an alert signal including an emergency vehicle alert (EVA), a second BSM, or both, the first BSM includes a speed of the first vehicle, heading of the first vehicle, and a location of the first vehicle, and the second BSM includes a speed of the emergency vehicle, a heading of the emergency vehicle, and a location of the emergency vehicle.

22. The method of claim 20, wherein the safety message includes a first basic safety message (BSM), the alert includes sensing information of the emergency vehicle, the first BSM includes a speed of the first vehicle, heading of the first vehicle, and a location of the first vehicle, receiving the alert of the emergency vehicle approaching the RSU includes sensing the emergency vehicle with a sensor to produce the sensing information, and the sensing information is selected from a group consisting of
one or more images of the emergency vehicle,
a size of the emergency vehicle,
a speed of the emergency vehicle,
a heading of the emergency vehicle,
a location of the emergency vehicle, and
detected siren sound.

23. A roadside unit (RSU) comprising:
at least one transceiver;
at least one memory; and
at least one processor, in signal communication with the at least one transceiver, and the at least one memory, the at least one processor configured to:
receive, via the at least one transceiver, a safety message from a first vehicle approaching the RSU;
receive, via the at least one transceiver, an alert of an emergency vehicle approaching the RSU; and
transmit, via the at least one transceiver, a control message to the first vehicle based on the alert, wherein the control message causes an infotainment system in the first vehicle to switch to an emergency alert mode.

24. The RSU of claim 23, wherein the control message causes the infotainment system in the first vehicle to switch to the emergency alert mode by causing the infotainment system to operate in a manner selected from the group consisting of pausing any media playback, reducing audio volume, graphically displaying a location of the emergency vehicle, and using a voice assistant to announce an approach of the emergency vehicle.

25. The RSU of claim 24, wherein the control message causes the infotainment system in the first vehicle to switch to the emergency alert mode by further causing the infotainment system to graphically display the location of the emergency vehicle on a main display of the infotainment system.

26. The RSU of claim 23, wherein
the safety message includes a first basic safety message (BSM),
the alert includes an alert signal including an emergency vehicle alert (EVA), a second BSM, or both, the first BSM includes a speed of the first vehicle, heading of the first vehicle, and a location of the first vehicle, and the second BSM includes a speed of the emergency vehicle, a heading of the emergency vehicle, and a location of the emergency vehicle.

27. The RSU of claim 26, wherein the at least one processor is further configured to
determine a threshold value for causing the infotainment system in the first vehicle to switch to the emergency alert mode, and
transmit the threshold value as part of the control message.

28. The RSU of claim 27, wherein the threshold value is selected from the group consisting of a timer value, a first location value for the location of the first vehicle, a second location value for the location of the emergency vehicle, and a distance value between the first location value and the second location value.

29. The RSU of claim 23, further including
at least one sensor,
wherein
the safety message includes a first basic safety message (BSM),
the alert includes sensing information of the emergency vehicle,
the first BSM includes a speed of the first vehicle, heading of the first vehicle, and a location of the first vehicle,
the at least one processor is configured to receive the alert of the emergency vehicle approaching the RSU by further being configured to sense the emergency vehicle with the at least one sensor to produce the sensing information, and
the sensing information is selected from a group consisting of one or more images of the emergency vehicle, a size of the emergency vehicle, a speed of the emergency vehicle, a heading of the emergency vehicle, a location of the emergency vehicle, and detected siren sound.

30. The RSU of claim 29, wherein the at least one processor is configured to transmit the control message to the first vehicle by further being configured to
transmit the control message to the first vehicle via a second RSU.

* * * * *